(12) United States Patent
Shisler et al.

(10) Patent No.: US 11,289,752 B2
(45) Date of Patent: Mar. 29, 2022

(54) PLATE ASSEMBLY FOR HEAT EXCHANGER

(71) Applicant: Modine Manufacturing Company, Racine, WI (US)

(72) Inventors: Kyle Shisler, Oak Creek, WI (US); Christopher Michael Moore, Racine, WI (US); Mitchell Crawford, Cudahy, WI (US); Thomas Grotophorst, Muskego, WI (US); Jason Braun, Franksville, WI (US); Frank Lippke, Filderstadt (DE)

(73) Assignee: MODINE MANUFACTURING COMPANY, Racine, WI (US)

( * ) Notice: Subject to any disclaimer, the term of this patent is extended or adjusted under 35 U.S.C. 154(b) by 0 days.

(21) Appl. No.: 16/074,324

(22) PCT Filed: Feb. 3, 2017

(86) PCT No.: PCT/US2017/016480
§ 371 (c)(1),
(2) Date: Jul. 31, 2018

(87) PCT Pub. No.: WO2017/136707
PCT Pub. Date: Aug. 10, 2017

(65) Prior Publication Data
US 2020/0006822 A1      Jan. 2, 2020

Related U.S. Application Data

(60) Provisional application No. 62/290,620, filed on Feb. 3, 2016.

(51) Int. Cl.
*H01M 10/6554*     (2014.01)
*H01M 10/6556*     (2014.01)
(Continued)

(52) U.S. Cl.
CPC ........ *H01M 10/6554* (2015.04); *F28D 9/005* (2013.01); *F28D 9/0037* (2013.01);
(Continued)

(58) Field of Classification Search
CPC ......... H01M 10/6554; H01M 10/6555; H01M 10/6556; H01M 10/6557; F28D 9/0037;
(Continued)

(56) References Cited

U.S. PATENT DOCUMENTS 2,777,674 A    1/1957   Wakeman
3,165,152 A    1/1965   Jones
(Continued)

FOREIGN PATENT DOCUMENTS

CN    1083584 A    3/1994
CN    1084961 A    4/1994
(Continued)

OTHER PUBLICATIONS

International Search Report and Written Opinion for Application No. PCT/US17/16480 dated Jun. 9, 2017 (17 pages).
(Continued)

*Primary Examiner* — Eric S Ruppert
*Assistant Examiner* — Hans R Weiland
(74) *Attorney, Agent, or Firm* — Michael Best & Friedrich LLP

(57) ABSTRACT

A plate assembly for a heat exchanger includes a first plate, a second plate, and an intermediate plate arranged between the first and second plates. The intermediate plate is joined to the first and second plates at peripheral edges to create a sealed periphery of the plate assembly. Corrugations of the intermediate plate provide crests and troughs that are in contact with inwardly facing surfaces of the first and second plates. The plate assembly can be configured as a battery
(Continued)

cooling plate heat exchanger to transfer heat from a battery to fluid flowing through the plate assembly.

19 Claims, 8 Drawing Sheets

(51) Int. Cl.
  *F28D 9/00* (2006.01)
  *F28F 9/02* (2006.01)
  *F28F 3/02* (2006.01)
  *F28F 3/04* (2006.01)
(52) U.S. Cl.
  CPC ......... *F28D 9/0056* (2013.01); *F28D 9/0093* (2013.01); *F28F 3/025* (2013.01); *F28F 3/046* (2013.01); *F28F 9/0253* (2013.01); *H01M 10/6556* (2015.04)
(58) Field of Classification Search
  CPC ...... F28D 9/005; F28D 9/0056; F28D 9/0062; F28D 9/0093; F28D 9/0253; F28D 9/0068; F28D 9/0081; F28F 3/046; F28F 3/025
  See application file for complete search history.

(56) References Cited

U.S. PATENT DOCUMENTS

| | | | |
|---|---|---|---|
| 3,847,211 A | 11/1974 | Fischel et al. | |
| 4,002,201 A | 1/1977 | Donaldson | |
| 4,407,357 A | 10/1983 | Hultgren | |
| 4,475,589 A | 10/1984 | Mizuno et al. | |
| 5,417,280 A | 5/1995 | Hayashi et al. | |
| 5,462,113 A | 10/1995 | Wand | |
| 5,896,834 A | 4/1999 | Gruener | |
| 5,988,269 A | 11/1999 | Karlsson et al. | |
| 6,034,872 A * | 3/2000 | Chrysler | H05K 7/20836 165/165 |
| 6,070,428 A | 6/2000 | Higashiyama et al. | |
| 6,098,706 A | 8/2000 | Urch | |
| 6,142,221 A | 11/2000 | Johansson | |
| 6,305,466 B1 | 10/2001 | Andersson et al. | |
| 6,564,862 B1 | 5/2003 | Persson | |
| 6,688,292 B2 | 2/2004 | Ruppel et al. | |
| 6,796,134 B1 | 9/2004 | Bucknell et al. | |
| 7,377,308 B2 | 5/2008 | Ware | |
| 7,721,543 B2 | 5/2010 | Massey et al. | |
| 8,434,433 B2 | 5/2013 | Ouradnik et al. | |
| 8,623,538 B2 | 1/2014 | Wang | |
| 8,844,611 B2 | 9/2014 | Yao et al. | |
| 2006/0278377 A1 | 12/2006 | Martins et al. | |
| 2009/0301700 A1 | 12/2009 | German et al. | |
| 2010/0261046 A1 | 10/2010 | German et al. | |
| 2012/0237805 A1* | 9/2012 | Abels | H01M 10/6557 429/83 |
| 2013/0171493 A1* | 7/2013 | Wayne | H01M 10/6557 429/120 |
| 2013/0244077 A1* | 9/2013 | Palanchon | H01M 10/6555 429/120 |
| 2014/0090813 A1 | 4/2014 | Schmid et al. | |
| 2014/0141300 A1* | 5/2014 | Ronning | H01M 10/6557 429/83 |
| 2014/0224452 A1* | 8/2014 | Abels | F28D 9/0037 165/104.11 |
| 2015/0140366 A1 | 5/2015 | Nicholls | |
| 2015/0198372 A1* | 7/2015 | Desikan | F28F 3/027 165/151 |
| 2016/0036104 A1 | 2/2016 | Kenney et al. | |
| 2016/0204486 A1* | 7/2016 | Kenney | H01M 10/6556 429/120 |
| 2016/0315365 A1 | 10/2016 | Vanderwees et al. | |
| 2016/0322652 A1* | 11/2016 | Nakata | F28D 9/0056 |

FOREIGN PATENT DOCUMENTS

| | | |
|---|---|---|
| CN | 103229326 A | 7/2013 |
| DE | 202009016426 U1 | 5/2010 |
| DE | 102010040829 A1 | 3/2012 |
| DE | 102012006122 A1 | 9/2013 |
| DE | 102012217869 A1 | 4/2014 |
| DE | 102013204739 A1 | 9/2014 |
| EP | 2835514 A1 | 2/2015 |
| EP | 2149771 B1 | 12/2016 |
| WO | 2013076104 A1 | 5/2013 |
| WO | 2015113161 A1 | 8/2015 |

OTHER PUBLICATIONS

Notification of First Chinese Office Action for Application No. 201780009614.8 dated Jun. 21, 2019 (5 pages).
First Office Action issued from the Chinese Patent Office for related Application No. 201911087785.X dated Sep. 29, 2020 (20 pages with English Translation).

* cited by examiner

PLATE ASSEMBLY FOR HEAT EXCHANGER

CROSS-REFERENCE TO RELATED APPLICATIONS

This application claims priority to U.S. Provisional Patent Application No. 62/290,620, filed Feb. 3, 2016, the entire contents of which are hereby incorporated herein by reference.

BACKGROUND

Chiller plates for cooling heat-producing devices such as batteries are known. These plates maintain the operating temperature of the heat-producing device within an acceptable operating range by efficiently removing the heat generated by the devices, thereby preventing degradation of the device due to excessive temperatures. Typically, the heat is removed by transfer to a fluid stream that is routed through the plates. In such applications, it is often desirable to maintain a predominantly uniform temperature profile over the surface of the plate. Such a uniform temperature profile can be especially desirable in the cooling of batteries, particularly in applications such as electric or hybrid motor vehicle battery cooling.

Prior known attempts at achieving the aforementioned uniform temperature profile have included the use of a high thermal inertia fluid as the cooling medium. The thermal inertia of a fluid can be characterized by the proportionality between the rate of temperature increase or decrease and the rate of heat input or output required to effect that rate of temperature increase or decrease. A high thermal inertia can be achieved through the use of a single phase fluid (e.g. a liquid) having either a high mass flow rate, a high specific heat capacity as a fluid property, or both. Such an approach has been found to be especially problematic in applications where multiple devices need to be cooled simultaneously, as is typically the case in electric or hybrid motor vehicle battery cooling.

When typical liquid coolants are used in such an application, very high fluid flow rates are required to minimize the undesirable temperature rise of the fluid as it receives heat from the batteries. Placing multiple very high fluid flows in parallel in order to cool the multiple batteries is problematic, as it requires a prohibitively oversized coolant handling system and substantial parasitic power to direct the coolant through the system. Placing the battery cooling devices in series along the coolant circuit is also undesirable, as the coolant temperature will inevitably rise along the series circuit, resulting in a disparity between the temperatures of the individual batteries.

Two-phase refrigerant cooling of batteries in electric or hybrid motor vehicle applications has also been proposed, but has also been found to be problematic. The use of refrigerant has the advantage of providing a cooling fluid with a high effective heat capacity when in the two-phase state, with evaporation of the fluid occurring with effectively no temperature rise. However, once the refrigerant is fully vaporized, any additional heat input will result in superheating of the refrigerant, causing a rapid temperature increase. When such a condition occurs within the battery cooling device, it results in a sharp discontinuity in battery temperature, which can be detrimental to the life and performance of the battery. Furthermore, the dynamic nature of the battery heat loads make it difficult, if not impossible, to maintain a refrigerant flow that does not result in such dry-out phenomena occurring.

SUMMARY

According to some embodiments of the invention, a plate assembly for a heat exchanger includes a first plate, a second plate, and an intermediate plate arranged between the first and second plates. The intermediate plate is joined to the first and second plates at peripheral edges to create a sealed periphery of the plate assembly. Corrugations of the intermediate plate provide crests and troughs that are in contact with inwardly facing surfaces of the first and second plates. The intermediate plate separates a first volume defined by the intermediate plate and the inwardly facing surfaces of the first plate from a second volume defined by the intermediate plate and the inwardly facing surfaces of the second plate. In some embodiments the first and second volumes are hydraulically separated from each other between the first and second plates. In other embodiments the first and second volumes are in fluid communication with one another at certain locations within the plate assembly.

In some embodiments, the plate assembly is a battery cooling plate heat exchanger and includes a fluid manifolding area arranged at one end of a lengthwise direction of the plate assembly. A first inlet chamber, first outlet chamber, second inlet chamber, and second outlet chamber are arranged within the fluid manifolding area. The first inlet chamber and the first outlet chamber are part of the first volume, and the second inlet chamber and second outlet chamber are part of the second volume. In some such embodiments the first inlet chamber overlaps with the second outlet chamber in a thickness direction of the plate assembly, and the second inlet chamber overlaps with the first outlet chamber in the thickness direction. In other such embodiments the first inlet chamber overlaps with the second inlet chamber in a thickness direction of the plate assembly, and the first outlet chamber overlaps with the second outlet chamber in the thickness direction.

In some embodiments, the plate assembly includes a first fluid chamber and a second fluid chamber. The first fluid chamber can be arranged in an embossed area of the first plate, and can be in fluid communication with, or can be part of, the first volume. The second fluid chamber can be arranged in an embossed area of the second plate, and can be in fluid communication with, or can be part of, the second volume. A first embossment extends from the intermediate plate towards the first plate, and engages the embossed area of the first plate to partially bound the second fluid chamber. A second embossment extends from the intermediate plate towards the second plate, and engages the embossed area of the second plate to partially bound the first fluid chamber. In some such embodiments the first and second fluid chambers are arranged immediately adjacent one another. In some embodiments the embossed area of the first plate is arranged directly opposite the embossed area of the second plate.

Alternatively, the first and second fluid chambers can be arranged between the first and second plates in a fluid manifolding area of the plate assembly. The first and second fluid chambers can overlap one another in a thickness direction of the plate assembly, and can be separated by a generally planar wall of the intermediate plate. In some embodiments the plate assembly can further include a third and fourth fluid chambers that are also arranged in the fluid manifolding area and that also overlap one another in the thickness direction. The third chamber can also be in fluid communication with, or can be part of, the first volume. The fourth chamber can also be in fluid communication with, or can be part of, the second volume. In some embodiments a bead is formed into one of the first and second plates and extends from an edge of that plate through the fluid manifolding area. The intermediate plate can be joined to the first and second plates in the region of the bead, thereby separating the first fluid chamber from the third fluid chamber and the second fluid chamber from the fourth fluid chamber.

In some such embodiments, the plate assembly includes a first set of nonlinear fluid flow paths that are arranged between the intermediate plate and the first plate. The first set of nonlinear fluid flow paths provide fluid connections between the first fluid chamber and the third fluid chamber. The plate assembly can further include a second set of nonlinear fluid flow paths that are arranged between the intermediate plate and the second plate. The second set of nonlinear fluid flow paths provide fluid connections between the second fluid chamber and the fourth fluid chamber. In some such embodiments, a fluid traveling along the first set of nonlinear fluid flow paths is traveling in a counterflow orientation to a fluid traveling along the second set of nonlinear flow paths.

In some embodiments the nonlinear fluid flow paths of the first set extend in a continuous and non-communicating manner between the first chamber and the third chamber, so that any fluid traveling through one of those nonlinear fluid flow paths is contained along that one of the flow paths between those chambers. Similarly, the nonlinear fluid flow paths of the second set can extend in a continuous and non-communicating manner between the second chamber and the fourth chamber.

In some embodiments, each of the nonlinear fluid flow paths includes at least two linear flow segments that extend in the length-wise direction of the plate assembly. Each of the linear flow segments of the first set can be adjacent to at least one, and sometimes, of the linear flow segments of the second set. Fluid traveling along a linear flow segment of the first set can be in a direction opposite to the direction of the fluid traveling through the adjacent linear flow segment of the second set.

In some embodiments, a first aperture extends through both the first plate and an embossment of the intermediate plate in order to allow for the flow of fluid into or out of the plate assembly through one of the fluid chambers. In some embodiments, a second aperture extends through the first plate in order to allow for the flow of fluid into or out of the plate assembly through another one of the fluid chambers. The second aperture may, but need not, also extend through the intermediate plate. In some, but not all, embodiments the first aperture extends through an embossed area of the first plate. In some, but not all, embodiments the first aperture or the second aperture or both further extends through the second plate to allow for the flow of fluid through the first fluid chamber. In some embodiments such an aperture extends through an embossed area of the second plate.

In some embodiments, the first plate is joined to peripheral edges of the intermediate plate at a first plane. The first plane can be located at a point that is approximately midway between the first plate and the second plate in a thickness direction of the plate assembly. Alternatively, the first plane can be located immediately below the outer surface of one of the first and second plates. The first plane can, in some embodiments, be coplanar with one of the inwardly facing surfaces with which crests and troughs of the intermediate plate are in contact. In some such embodiments that one of the first and second plates can be a flat plate without any formed edges.

In some embodiments an embossed area of the first plate defines a second plane that is parallel to the first plane. The inwardly facing surfaces of the first plate with which crests and troughs of the intermediate plate are in contact can be arranged in a third plane that is parallel to and between the first and second planes. In some embodiments the first plate includes a plurality of elongated beads extending from the third plane to the first plane to create a circuitous fluid flow path within the first volume. In some embodiments the circuitous fluid flow path includes multiple parallel arranged and serially connected flow passes, with the first fluid chamber being fluidly connected to the first or the last of the serially connected flow passes.

In some embodiments, the second plate is joined to peripheral edges of the intermediate plate at a fourth plane parallel to the first plane. An embossed area of the second plate defines a fifth plane that is parallel to the first plane. The inwardly facing surfaces of the second plate with which crests and troughs of the intermediate plate are in contact are arranged in a sixth plane that is parallel to and between the fourth and fifth planes. In some embodiments the second plate includes a plurality of elongated beads extending from the sixth plane to the fourth plane to create a circuitous fluid flow path within the second volume. In some embodiments the circuitous fluid flow path includes multiple parallel arranged and serially connected flow passes, with the second fluid chamber being fluidly connected to the first or the last of the serially connected flow passes.

In some embodiments, the plate assembly includes a first, a second, a third, and a fourth fluid chamber. The first fluid chamber can be at least partially arranged in a first embossed area of the first plate and can be in fluid communication with the first volume. The second fluid chamber can be at least partially arranged in a first embossed area of the second plate and can be in fluid communication with the second volume. The third fluid chamber can be at least partially arranged in a second embossed area of the second plate and can be in fluid communication with the second volume. The fourth fluid chamber can be arranged in a second embossed area of the first plate and can be in fluid communication with the first volume. In some embodiments the first and second embossed areas of the first plate and the first and second embossed areas of the second plate are arranged along a common edge of the plate assembly. In some embodiments the first, second, third, and fourth fluid chambers are arranged in a row such that the second and third fluid chambers are between the first and the fourth fluid chambers.

In some such embodiments, the first embossed area of the second plate is arranged directly opposite the first embossed area of the first plate, and the second embossed area of the second plate is arranged directly opposite the second embossed area of the first plate. In some such embodiments, embossments extend from the intermediate plate and engage the embossed areas of the first and second plates in order to provide fluid separation between the first and second fluid chambers and between the third and fourth fluid chambers.

In some embodiments, the plate assembly includes an inlet port for a first fluid, an outlet port for the first fluid, an inlet port for a second fluid, and an outlet port for the second fluid, all joined to the first plate. The inlet port for the first fluid is in fluid communication with either one of the first and fourth fluid chambers, and the outlet port for the first fluid is in fluid communication with the other one of the first and fourth fluid chambers. The inlet port for the second fluid is in fluid communication with either one of the second and third fluid chambers, and the outlet port for the second fluid is in fluid communication with the other one of the second and third fluid chambers. In some such embodiments, the inlet and outlet ports for the second fluid are provided in a single fitting block.

In some embodiments, the plate assembly includes an inlet header and an outlet header that are in fluid communication with the first and second volumes. Flow can be received from the inlet header into one or more of the fluid chambers and can be directed along at least some of the nonlinear fluid flow paths through the plate assembly. The flow can be received from one or more other ones of the fluid chambers into the outlet header. In some embodiments a first flow circuit extending between the inlet header and the outlet header through the first fluid volumes is hydraulically in parallel with a second flow circuit extending between the inlet header and the outlet header through the second fluid volume.

In some embodiments, the plate assembly is one of several such plate assemblies arranged in a stack. The first and second embossed areas of the first plate of the plate assembly engages the first and second embossed areas of the second plate of an adjacent plate assembly in the stack. The first and second embossed areas of the second plate of the plate assembly engages the first and second embossed areas of the first plate of another adjacent plate assembly in the stack.

According to other embodiments of the invention, a heat exchanger includes multiple plate assemblies arranged in a stack. At least some of the plate assemblies have a first, second, and intermediate plate. The intermediate plate is arranged between the first and second plate, and is joined to those plates at peripheral edges to create a sealed periphery of the plate assembly. A first inlet manifold and a first outlet manifold extend through the stack for a first fluid, and are fluidly connected by first fluid flow passages extending through at least some of the plate assemblies. A second inlet manifold and a second outlet manifold extend through the stack for a second fluid, and are fluidly connected by second fluid flow passages extending through at least some of the plate assemblies. Flow channels for a third fluid are arranged between adjacent ones of the plate assemblies.

In some such embodiments, the inlet and outlet manifolds are defined by embossed areas of the first and second plates of the plate assemblies. The embossed areas of adjacent plate assemblies in the stack engage each other to define one or more columns extending through the stack. Some such embodiments have a first column that contains one of the first inlet and outlet manifolds and one of the second inlet and outlet manifold, and a second column that contains the other first and second inlet and outlet manifolds. In some embodiments the first and second columns are arranged at diagonally opposing corners. In other embodiments the first and second columns are arranged along a common side of the heat exchanger.

In some embodiments, the peripheral edges of the first, second, and intermediate plate of each plate assembly are angled upturned edges so that the sealed periphery of each plate assembly is formed by nesting of the plates. Adjacent plate assemblies are similarly nested together.

In some embodiments, at least some of the plate assemblies include a second intermediate plate that is joined to the intermediate plate and to the first and second plates at peripheral edges. The first fluid passages are arranged between the intermediate plates and the first and second plates, and the second fluid flow passages are arranged between the intermediate plates.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
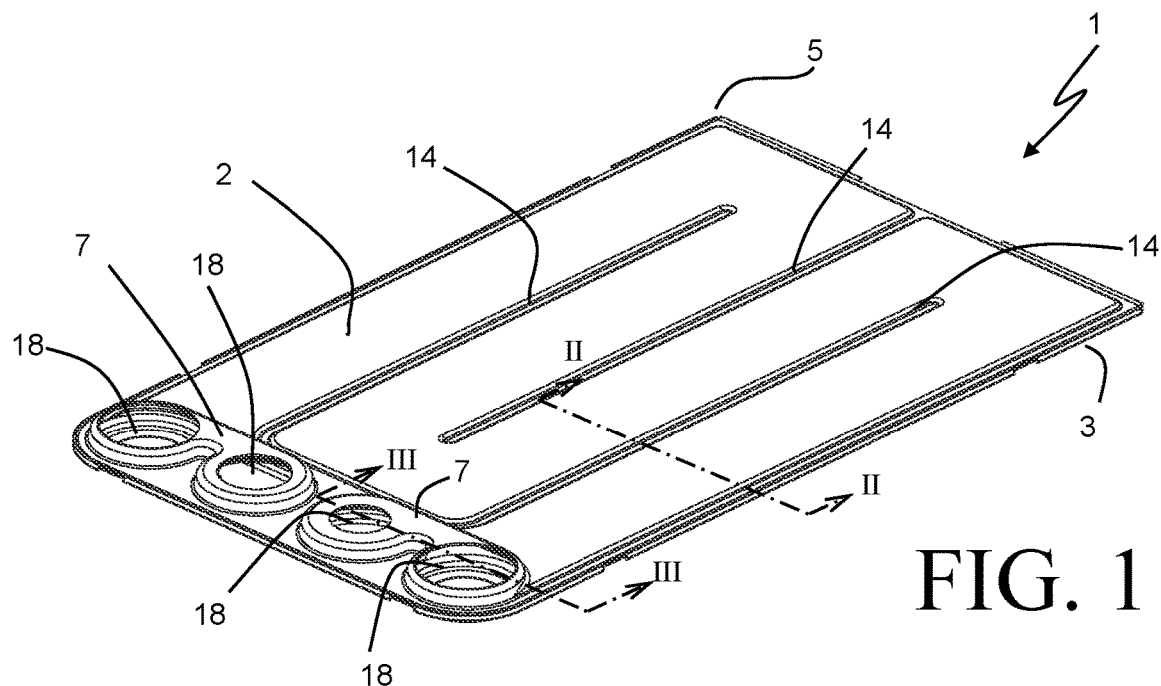
FIG. 1 is a perspective view of a plate assembly for a heat exchanger according to an embodiment of the invention.
Figure 2:
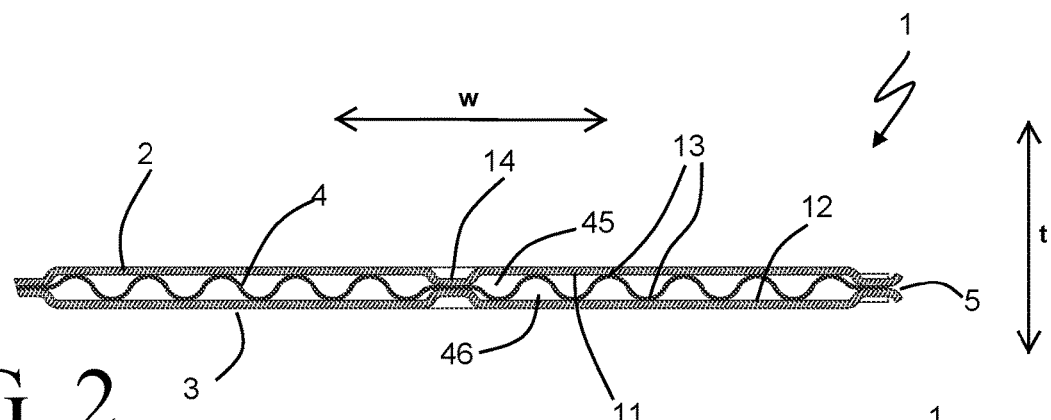
FIG. 2 is a partial sectional view taken along the lines II-II of FIG. 1.

A plate assembly 1 for a heat exchanger is depicted in FIGS. 1-4, and includes three plates (a first plate 2, a second plate 3, and an intermediate plate 4 between the first plate 2 and the second plate 3) that are joined together at their respective peripheral edges 5, being assembled in the stacking direction or thickness direction (t) of the plate assembly, as shown in FIG. 2. The thickness direction (t), as shown in FIG. 2, is perpendicular to a width direction (w) of the plate assembly 1. The plates 2, 3, 4 are preferably formed from thin metallic sheets by stamping or otherwise forming the sheet material. In some highly preferable embodiments the plates 2, 3, 4 are formed from sheets of an aluminum alloy, although other metal materials such as steel, copper, titanium, or others might be equally or more suitable in certain applications. At least some of the plates 2, 3, 4 can have a layer of braze material applied to at least some of the plate surfaces, so that metallic joints can be formed at contacting surfaces of the plates. Such a braze material can be applied after forming of the plates, or before forming (as a clad layer on the base material, for example).

A central portion of both the first plate 2 and the second plate 3 is formed outward from the peripheral sealing surfaces to create an interior space between the plates 2, 3. The intermediate plate 4 is provided with corrugations 17 in corresponding regions of the plate in order to fill that interior space between the plates 2, 3. The corrugations 17 define crests and troughs 13, which are disposed against inwardly facing surfaces 11, 12 of the plates 2, 3 respectively, and are joined thereto, preferably by brazing.

Figure 13:
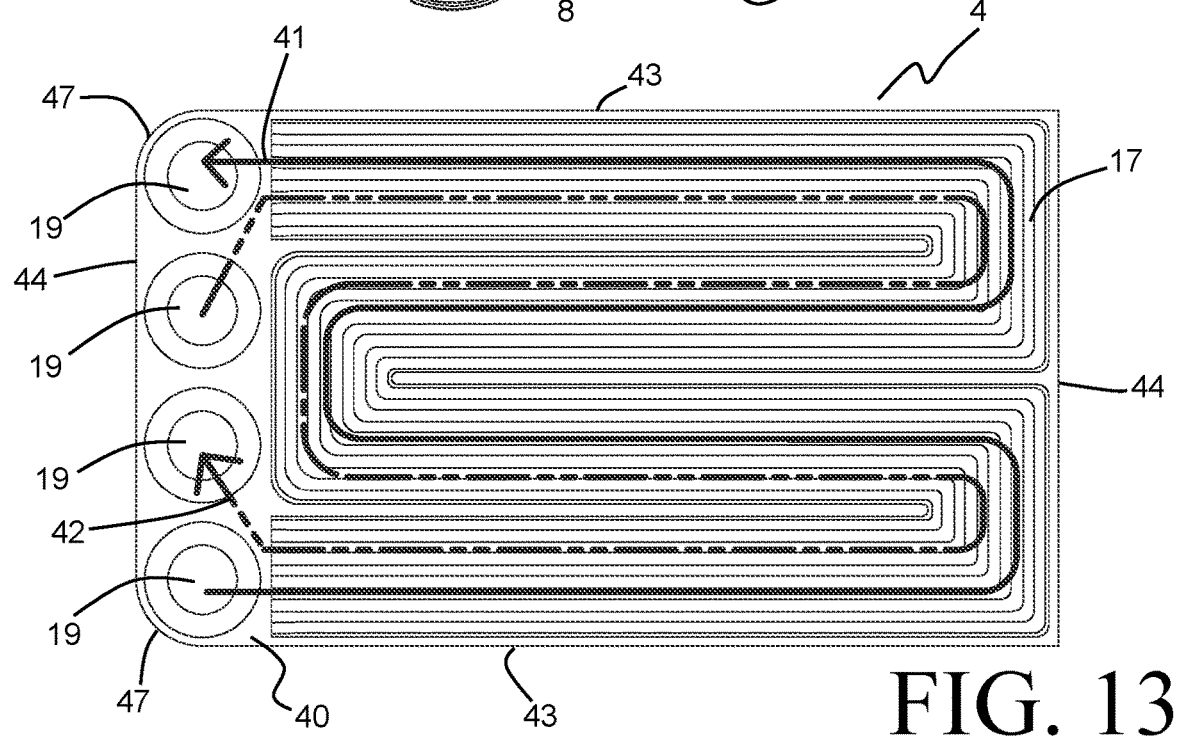
FIG. 13 is a plan view of an intermediate plate from the plate assembly of FIG. 1.

The intermediate plate 4 has a generally rectangular shape, defined by a first pair of spaced apart and parallel edges 43, and a second pair of spaced apart and parallel edges 44, the second pair of edges 44 being arranged to be perpendicular to the first pair of edges 43. An edge 43 and an edge 44 can meet one another at a sharp corner, as shown in FIG. 13. Alternatively or in addition, edges 43 and 44 can be joined by a short edge segment such as the arcuate edge segments 47 also depicted in FIG. 13.

Figure 4:
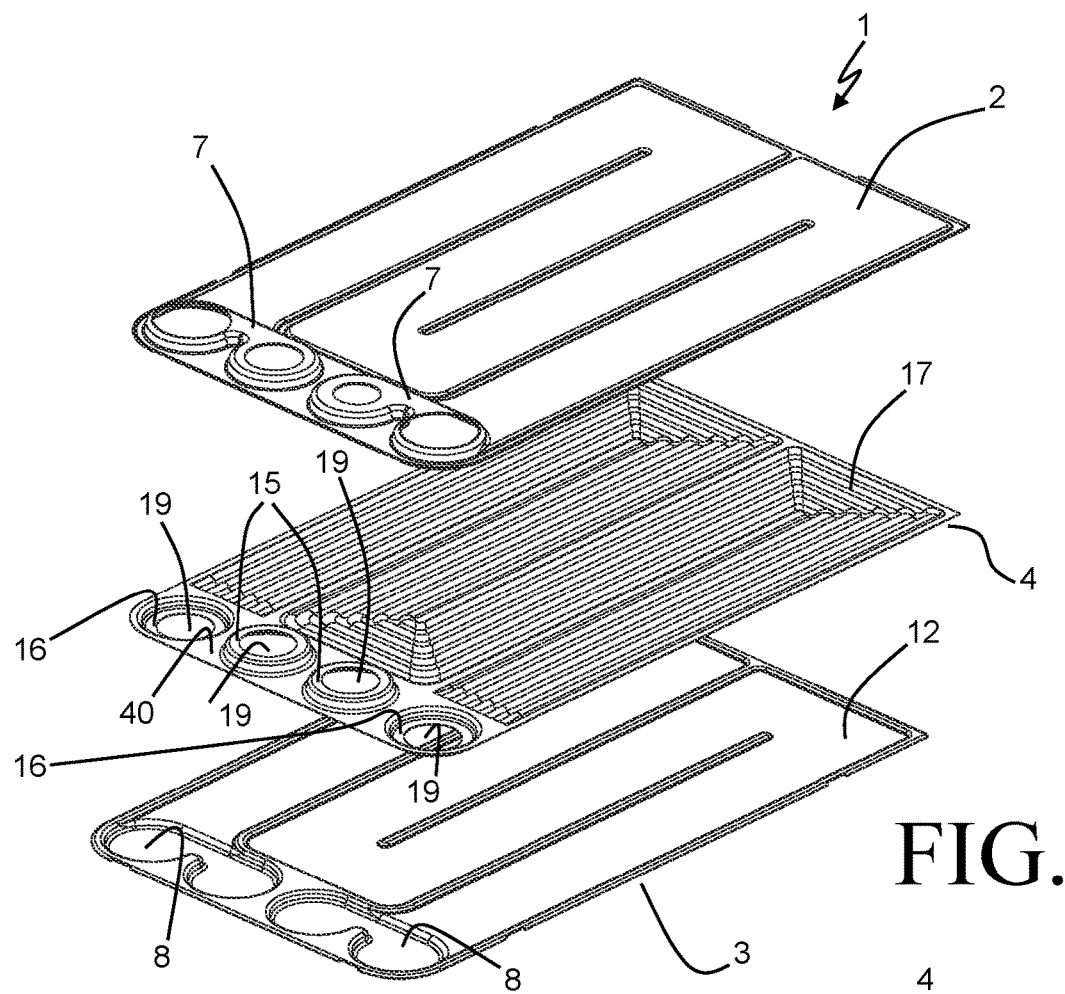
FIG. 4 is an exploded perspective view of the plate assembly of FIG. 1.

As best seen in FIG. 4 and in FIG. 13, the corrugations 17 are formed into the intermediate plate 4 so that the crests and troughs 13 are formed on either side of a flat surface 40 of the plate. The flat surface 40 extends around the outer periphery of the intermediate plate 4 to provide the peripheral edge sealing surfaces for the first and second plates 2 and 3. Each of the corrugations 17 is formed outwardly from the flat surface 40, with multiple long sections of each corrugation 17 joined by shorter sections arranged perpendicular to the long sections. In the exemplary embodiment of FIG. 13, each of the corrugations includes four long segments aligned parallel to the edges 43, sequentially joined by three short segments aligned parallel to the edges 44, although it should be understood that more or fewer segments can alternatively be employed. When the plates 2, 3, 4 are joined to form the plate assembly 1, the intermediate plate 4 separates the space between the plates 2, 3 into a first volume 45 arranged between the first plate 2 and the intermediate plate 4, and a second volume 46 arranged between the second plate 3 and the intermediate plate 4.

The crests and troughs 13 in contact with the inwardly facing surfaces 11, 12 divide the first and second volumes 45, 46 into multiple flow channels for fluid flow through the volumes 45, 46. These flow channels follow the contours of the corrugations 17, and extend in an unbroken and non-communicating manner through the interior space between the plates 2 and 3. Elongated beads 14 extend from raised central portion of the plates 2, 3 to the flat surface 40 of the intermediate plate 4 between the groupings of the long sections of the corrugations 17, and are generally centrally aligned with the short segments, in order to channel fluid through the flow channels. The intermediate plate 4 serves to hydraulically separate the flow channels in the first volume 45 from the flow channels in the second volume 46, while still allowing for the transfer of thermal energy by conduction through the relatively thin intermediate plate 4.

The arrangement of the intermediate plate 4 within the plate assembly 1 allows two separate fluids to be directed to flow through the two volumes 45, 46 in isolation from each other, while still enabling beneficial heat exchange between the fluids. Referring to FIG. 13, the overall flow arrangement of two fluids through the flow channels is depicted by the arrows 41, 42. The solid arrow 41 depicts the flow of a fluid through the flow channels in the first volume 45, while the dashed arrow 42 depicts the flow of another fluid through the flow channels in the second volume 46. In the exemplary embodiment of FIG. 13 the two flows are depicted as flowing in counter-flow orientation, but it should be understood by those of skill in the art that for some applications concurrent flow may be beneficial, and can be achieved by reversing the direction of one of the two flows. Individual ones of the flow channels in a given flow volume 45, 46 are arranged to be hydraulically in parallel, as will be further described.

Arranged along one of the shorter edges of the plate 2 is an embossed area 7, which extends outwardly from the peripheral sealing surfaces by a greater amount than does the formed central portion of the plate. A similar embossed area 8 is provided along a corresponding edge of the plate 3. A first pair of circular embossments 15 extend from the flat surface 40 of the intermediate plate 4, and these circular embossments 15 are disposed against and joined to the embossed area 7 of the plate 2. A second pair of circular embossments 16 extend from the flat surface 40 of the intermediate plate 4 in a direction opposing that of the first pair of circular embossments 15, and are disposed against and joined to the embossed area 8 of the plate 3. The joining of the embossments 15, 16 to the embossed areas 7, 8 is preferably accomplished by brazing. As best seen in FIG. 4, the embossments 15, 16 are arranged in a row, with the embossments 16 occupying terminal positions in the row and the embossments 15 occupying central positions in the row. Circular apertures 19 extend through the embossments 15, 16. Similarly, circular apertures 18 extend through the embossed area 7 of the plate 2 in axial alignment with the circular embossments 15, 16 of the intermediate plate 4.

Figure 3:
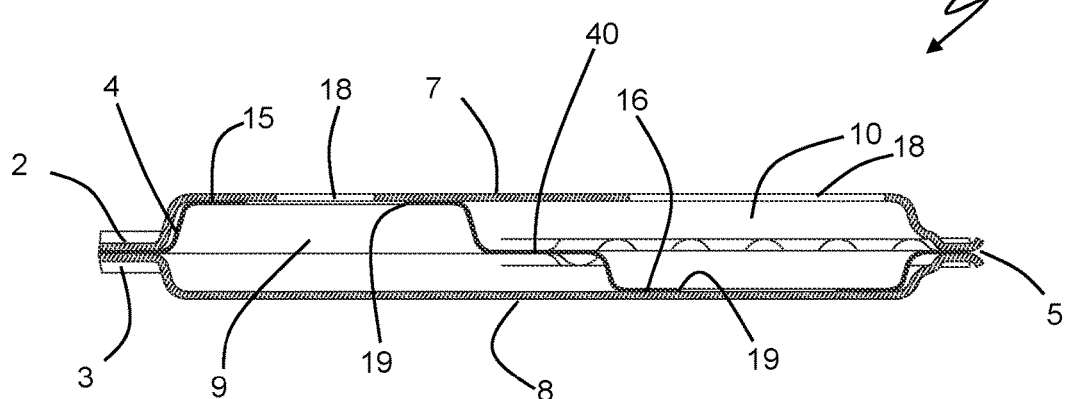
FIG. 3 is a partial sectional view taken along the lines of FIG. 1.

With specific reference to FIG. 3, the manner by which the individual flow channels of each of the volumes 45, 46 are placed hydraulically in parallel will now be described. FIG. 3 shows one of the circular embossments 15 of the intermediate plate 4 disposed against the embossed area 7 of the plate 2, and one of the circular embossments 16 of the intermediate plate 4 disposed against the embossed area 8 of the plate 3. Two separated fluid chambers are thereby formed within the space provided between the embossed area 7 of the plate 2 and the embossed area 8 of the late 3. A first fluid chamber 9 is at least partially bounded by the embossed area 8 of the plate 3 and the circular embossment 15 of the intermediate plate 4, and extends generally the full height of the space provided between the embossed areas 7, 8. Similarly, a second fluid chamber 10 is at least partially bounded by the embossed area 7 of the plate 2 and the circular embossment 16 of the intermediate plate 4, and also extends generally the full height of the space provided between the embossed areas 7, 8. The chambers 9, 10 are hydraulically separated from one another by the intermediate plate 4 itself.

The flat surface 40 of the intermediate plate 4 extends between the chambers 9, 10 of FIG. 3 and ends of the flow channels defined by the corrugations 17. The presence of the embossed areas 7, 8 allow for the flow of fluid between the chambers 9, 10 and the flow channels provided on a corresponding side of the intermediate plate 4, so that the fluid chamber 9 can serve as a fluid inlet or outlet manifold for fluid passing through the flow channels of the volume 46, and the fluid chamber 10 can similarly serve as a fluid inlet or outlet manifold for fluid passing through the flow channels of the volume 45.

As can be inferred from the exploded view of FIG. 4, similar chambers 9, 10 can be provided by the other circular embossments 15 and 16 respectively, with those chambers communicating with the opposing ends of the flow channels defined by the corrugations 17. In this manner, two separate fluids can be directed to flow through flow channels of the plate assembly 1 (i.e. a first fluid through the volume 45 along the path indicated by the arrow 41, and a second fluid through the volume 46 along the path indicated by the arrow 42) while remaining hydraulically separate from each other. Direct flow of fluid between the fluid chambers 9 or between the fluid chambers 10 is undesirable as it would bypass the flow channels provided by the corrugations, and is prevented by forming both the embossed area 7 and the embossed area 8 in two separated parts, the two parts being separated by a portion of the plate 2 or 3 that is joined to the flat surface 40 of the intermediate plate 4 to create a fluid seal.

Fluid can be passed into or out of the plate assembly 1 at the fluid chambers 8, 9 through the apertures 18 provided in the plate 2. In the case where one of the circular embossments 15 of the intermediate plate 4 is disposed against and joined to the embossed area 7 of the plate 2, as is the case for the fluid chamber 9 depicted in FIG. 3, the fluid must pass through both one of the apertures 19 provided at that one of the circular embossments 15, as well as through an aperture 18. In contrast, in the case where one of the circular embossments 15 is disposed against and joined to the embossed area 8 of the plate 3, as is the case for the fluid chamber 8 of FIG. 3, the aperture 19 is not necessary in that one of the circular embossments 15, and can either be included or dispensed with. It should further be understood that, in some embodiments, it may be preferable for at least some of the apertures 18 to be instead provided on the plate 3 so that entry or exit of fluid to or from at least some of the chambers 9, 10 is provided on the opposing side of the plate assembly 1. In some especially preferable embodiments, the plates 2 and 3 can be identical plates, or substantially identical with the exception of certain features. As an example, the plates 2, 3 can be identical except for the apertures 8, so that the same tooling can be used to form the plates 2, 3.

In the exemplary embodiment of FIGS. 1-4, the peripheral edges 5 forming the perimeter seal for the plate assembly 1 are all generally arranged within a plane that generally coincides with the flat surface 40 of the intermediate plate 4. The embossed area 7 of the plate 2 further defines another plane that is parallel to the plane defined by the peripheral edges 5. Furthermore, the raised central portion of the plate 2 wherein the corrugations 17 of the intermediate plate 4 are located defines yet another plane that is parallel to both the aforementioned planes, and is located therebetween. The embossed area 8 and the raised central portion of the plate 3 are similarly formed to create planes that are parallel to the plane containing the peripheral edges 5. In this manner, the plane containing the peripheral edges 5 is centrally located between the planes defined by the embossed areas 7 and 8, and is furthermore centrally located between the planes defined by the raised central portions of the plates 2 and 3, with the planes defined by the embossed areas 7 and 8 being spaced apart by a greater distance than the planes defined by the raised central portions.

Figure 5:
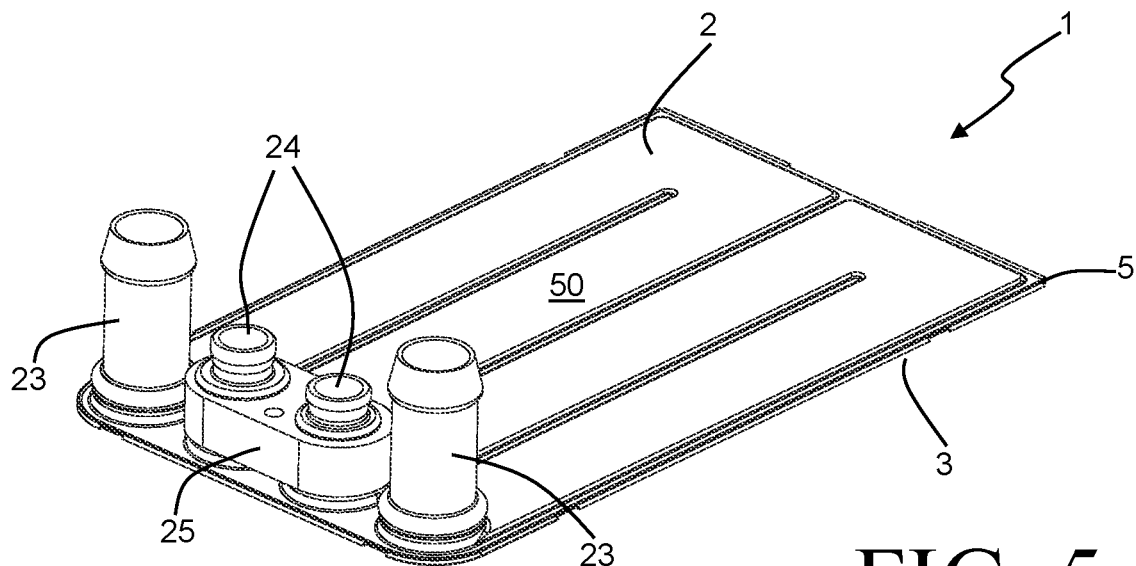
FIG. 5 is a perspective view of a heat exchanger employing the plate assembly of FIG. 1, according to an embodiment of the invention.

In some embodiments, the plate assembly 1 can be used to exchange heat between a liquid coolant flowing through one of the fluid volumes 45, 46 and a refrigerant flowing through the other of the fluid volumes 45, 46, while simultaneously receiving heat energy through the outwardly facing surfaces of one or both of the plates 2, 3. A plate assembly 1 configured for such an embodiment is depicted in FIG. 5. Coolant inlet and outlet ports 23 are provided at the embossed area 7 of the plate 2, and allow for fluid communication between a liquid coolant system (not shown) and the fluid chambers 10. Liquid coolant is received through one of the coolant ports 23 into one of the fluid chambers 10 and is directed through the flow channels that extend through the volume 45 before being received into the other fluid chamber 10 and removed from the plate assembly 1 through the other coolant port 23. Simultaneously, a flow of refrigerant is directed through the volume 46 of the plate assembly 1 through the use of a refrigerant fitting block 25 that is also provided at the embossed area 7 of the plate 2. The fitting block 25 includes refrigerant inlet and outlet ports 24, each of which are in fluid communication with one of the fluid chambers 9. A flow of refrigerant is received into one of the refrigerant ports 24 from a refrigerant system (not shown) in a liquid state or a low vapor quality two-phase state, and is directed through the flow channels that extend through the volume 46. The refrigerant is subsequently received into the other fluid chamber 9, preferably in a superheated vapor or high vapor quality two-phase state, and is returned to the refrigerant system through the other refrigerant port 24 provided in the fitting block 25.

The plate assembly 1 of FIG. 5 can find particular utility as a chiller plate for cooling a heat-producing solid device such as, for example, a battery. Such a device can be disposed directly against the outwardly facing planar surface 50 of the plate 2, so that heat generated by the device is efficiently transferred through the plate 2 into the fluids passing through the plate assembly 1. The present invention provides the capability to maintain a substantially uniform temperature profile over the planar surface 50, thereby improving both the performance and durability of the device.

By combining two separate fluid flows within a single plate assembly 1, the undesirable aspects of both single-phase liquid cooling and two-phase refrigerant cooling can be avoided. A liquid coolant of a lower flow rate can be used as the fluid circulating through the volume 45 in order to receive heat input through the surface 50, while simultaneously rejecting heat to a lower-temperature refrigerant stream circulating through the volume 46. The rejection of heat from the liquid coolant while still within the plate assembly 1 enables the flow of liquid coolant to remain within a desirable temperature range throughout the flow path 41, without requiring a high mass flow rate. In addition, the presence of the liquid coolant as an intermediary fluid between the heat source disposed against the surface 50 and the flow of refrigerant along the flow path 42 provides increased thermal inertia over a refrigerant-only cooling system.

In some embodiments, a system including multiple such battery cooling plates 1 can be implemented in order to cool multiple batteries. It may be especially desirable to operate such a system so that the rate of heat transfer into the coolant through the surface 50 is approximately equal to the rate of heat transfer from the coolant to the refrigerant, so that the liquid coolant is removed from the plate assembly 1 at a temperature that is approximately equivalent to the temperature at which it entered the plate assembly 1. Such operation allows for multiple plate assemblies 1 to be arranged hydraulically in series along the liquid coolant circuit while still maintaining a uniform temperature for each of the batteries.

Figure 6:
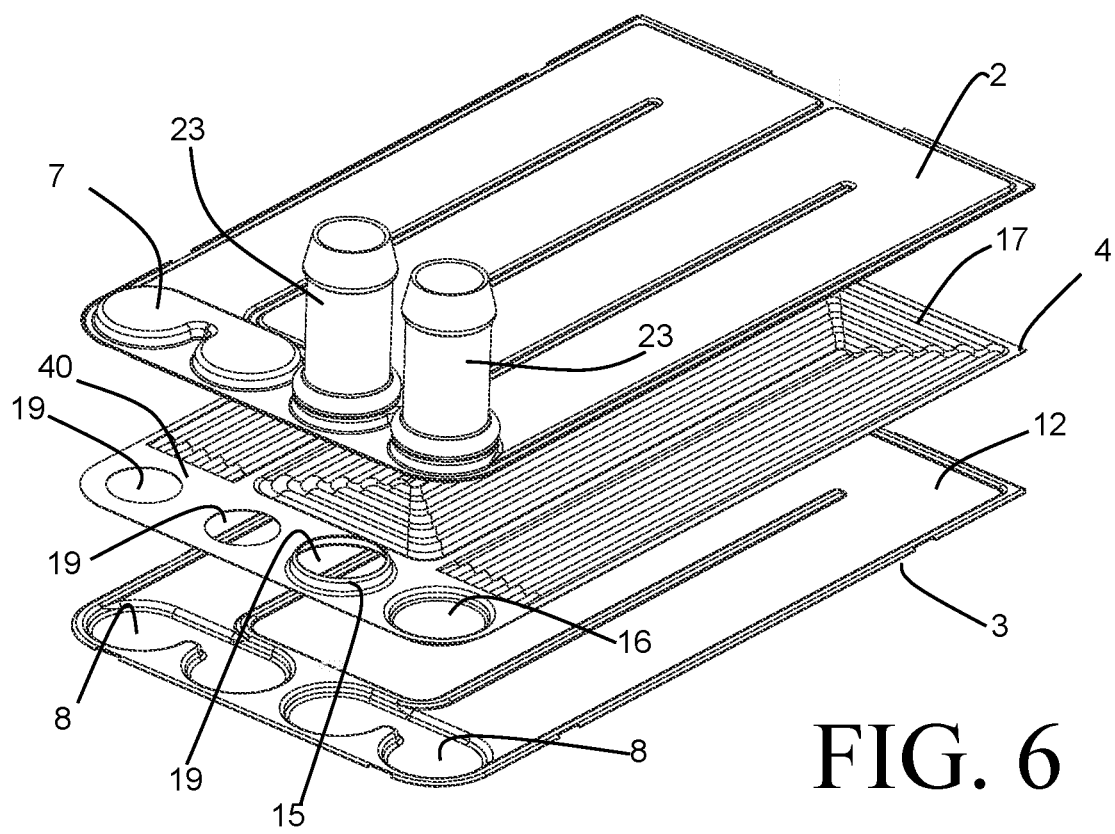
FIG. 6 is an exploded perspective view of a heat exchanger employing the plate assembly of FIG. 1, according to another embodiment of the invention.

An alternative embodiment of the plate assembly 1 is depicted in exploded view in FIG. 6, and is intended to be used with only a single fluid. In the exemplary embodiment of FIG. 6, the single cooling fluid is a liquid coolant, and a pair of coolant ports 23 are provided at two adjacent apertures 18 of the top plate 2. It should be appreciated that in other embodiments the single cooling fluid could be a refrigerant, and the fitting block 25 having two refrigerant ports 24 could be provided at the same location in place of the coolant ports 23.

In the embodiment of FIG. 6, the cooling fluid is introduced into the plate assembly 1 through one of the coolant ports 23, and is routed through one of the volumes 45, 46 in a similar manner to that described previously with respect to the embodiment of FIGS. 1-5. However, the intermediate plate 4 is only provided with the circular embossments 15, 16 in those locations that correspond to the locations of the coolant ports 23. Apertures 19 are provided in the planar surface 40 of the intermediate plate 4 at the two additional locations where embossments 15, 16 were provided in the embodiment of FIGS. 1-5, and these two apertures 19 allow for the coolant to pass from one side of the intermediate plate 4 to the other side of the intermediate plate. Accordingly, the coolant will be routed along the flow passages extending through one of the volumes 45, 46 and, subsequently, through the flow passages extending through the other one of the volumes 45, 46. The coolant flow is thereby placed in counter-current flow orientation to itself as it passes along the opposite sides of the plate, so that heat can be transferred through the intermediate plate 4 between the coolant flow near the inlet port 23 and coolant flow near the outlet port 23. Such heat transfer can smooth out the temperature profile of the coolant flow passing through plate assembly 1, allowing for a more uniform fluid temperature.

In yet another embodiment, illustrated in FIGS. 14-18, a plate assembly 51 specifically adapted for use as a battery cooling plate heat exchanger uses a single cooling fluid to provide one or more chilled outer surfaces to which a battery or other heat producing source can be attached, so that the temperature of the battery or other heat producing source can be maintained through the removal of heat energy into the cooling fluid. Unlike the plate assembly of FIG. 6, the cooling fluid in the plate assembly 51 makes only a single pass through the plate assembly between an inlet manifold and an outlet manifold.

Figure 15:
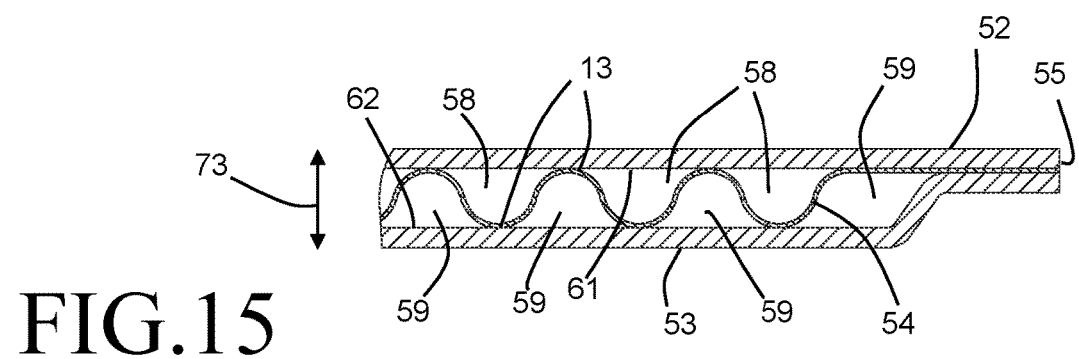
FIG. 15 is a partial section view taken along the lines XV-XV of FIG. 14.
Figure 16:
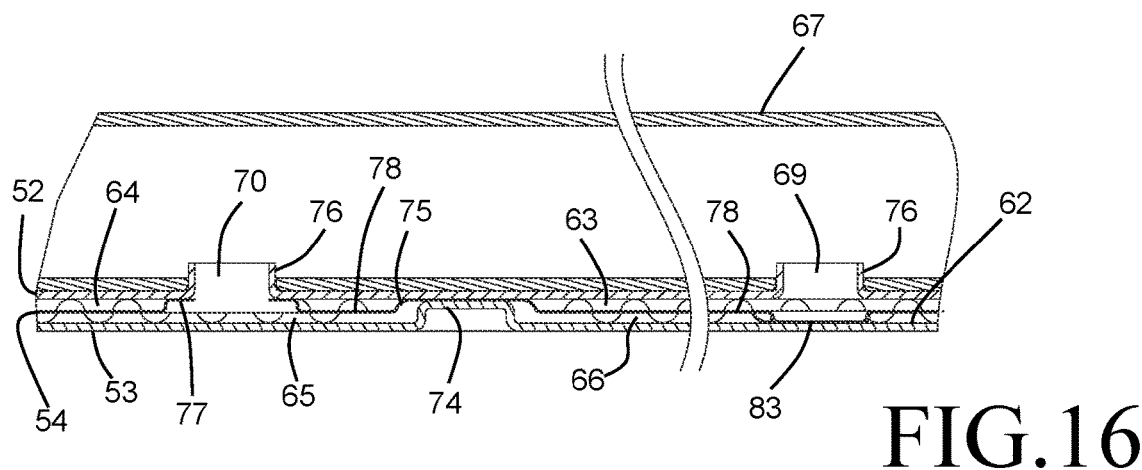
FIG. 16 is a partial section view taken along the lines XVI-XVI of FIG. 14.

The plate assembly 51 includes a first plate 52, a second plate 53, and an intermediate plate 54 arranged therebetween. The three plates 52, 53, and 54 generally correspond to the plates 2, 3, and 4, respectively of the previously described plate assembly 1. Each of the plates 52, 53, 54 is of a generally rectangular shape of equal footprint, and the plates are joined together along peripheral edges 55 (as best seen in FIG. 15) in order to seal the plate assembly 51. In similar fashion as was described with respect to the intermediate plate 4, the intermediate plate 54 is provided with corrugation 17 that create crests and troughs 13. Theses crests and troughs 13 are disposed against inwardly facing surfaces 61, 62 of the plates 52, 53 respectively, and are joined thereto, preferably by brazing.

The intermediate plate 54 is provided with a planar peripheral edge surface 80 that lies within a common plane as the crests 13 disposed against the plate 52, so that the edge surface 80 is disposed against the inwardly facing surface 61 along the outer periphery 55. Such a design can provide certain advantages over the previously described embodiment of the plate assembly 1, wherein the joined edges were located within a central plane of the plate assembly along a thickness dimension of the plate assembly, by providing a continuous outwardly facing planar surface on the plate 52. Such a continuous planar surface can provide advantages in the mounting of a heat producing source such as a battery to that outwardly facing surface. However, in some embodiments it may be more preferable to adapt the plate assembly 52 to have the centrally located edge joints shown in FIGS. 1-3. Likewise, the plate assembly 1 described earlier can alternatively be adapted to use the peripheral joint shown in FIG. 15.

Figure 17:
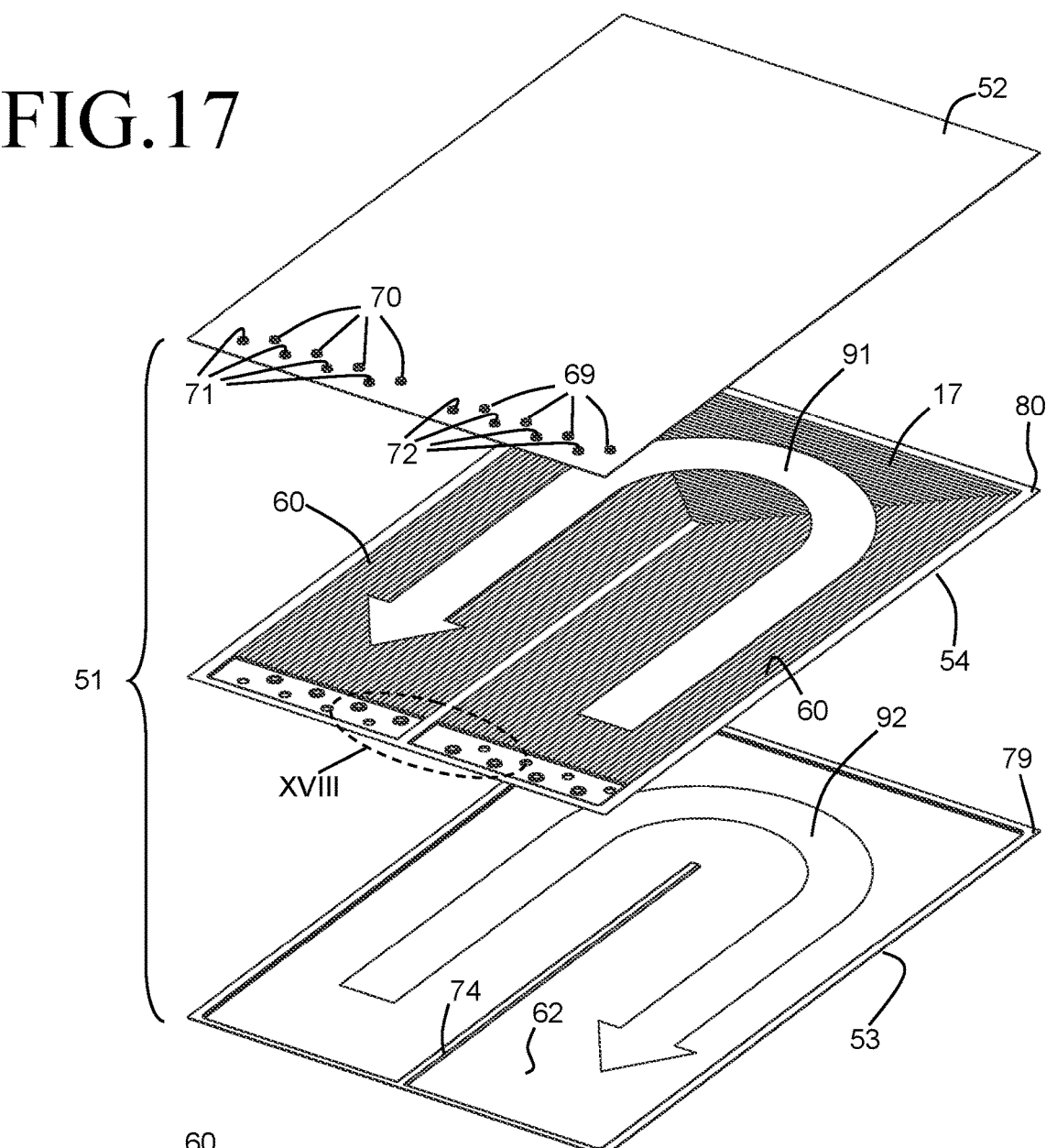
FIG. 17 is an exploded perspective view of a portion of the battery cooling plate heat exchanger of FIG. 14.
Figure 18:
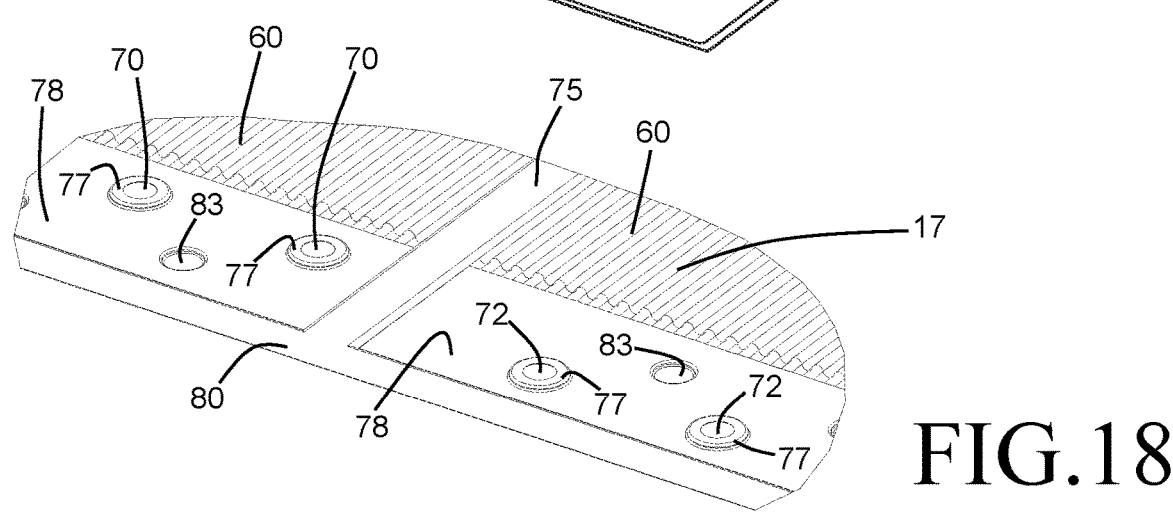
FIG. 18 is a detail view of the portion of FIG. 17 contained within the dashed-line oval indicated by XVIII.

As best seen in the exploded view of FIG. 17, the plate 53 is provided with a peripheral planar edge surface 79, which is joined to the intermediate plate 54 along the periphery 55, and a central dished region 62. The central dished region 62 forms a space between the inwardly facing surfaces 61 and 62, within which the corrugations 17 of the intermediate plate 54 are located. In a similar fashion to that described previously with respect to the corrugations 17 of the intermediate plate 4, the corrugations 17 of the intermediate plate 54 define multiple fluid flow channels that follow the contours of the corrugations 17 and extend in an unbroken and non-communicating manner through the interior space between the plates 52 and 53. As can be seen in the section view of FIG. 15, flow channels 58 are provided between the intermediate plate 54 and the plate 52, and flow channels 59 are provided between the intermediate plate 54 and the plate 53.

Figure 14:
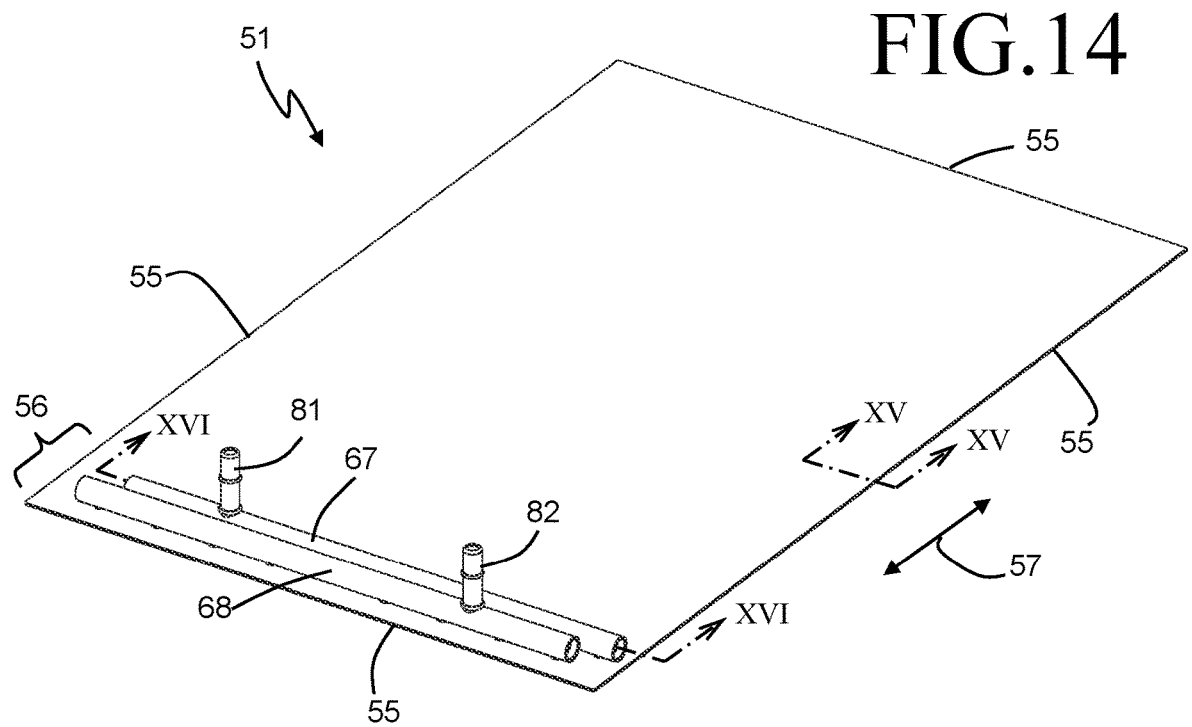
FIG. 14 is a perspective view of a battery cooling plate heat exchanger according to an embodiment of the invention.

The plate assembly 51 extends in what will be referred to as a lengthwise direction, indicated in FIG. 14 by the double-ended arrow 57. In the exemplary embodiment the length-wise direction 57 is the longer direction of the plate assembly 51, but it should be understood that in some embodiments the length-wise direction may be the shorter direction of the plate assembly. A fluid manifolding area 56 is provided at one end, in the length-wise direction, of the plate assembly 51. The fluid manifolding area 56 is characterized by an absence of corrugations 17 in the intermediate plate 54. As can be best seen in FIG. 18, the intermediate plate 54 is provided with a generally planar wall 78 in the manifolding area, with that planar wall 78 being located approximately midway between the inwardly facing surfaces 61 and 62 in the thickness direction of the plate assembly (the thickness direction being indicated in FIG. 15 by the double-ended arrow 73).

The fluid manifold area 56 includes four separate chambers. Two chambers 63 and 64 are arranged between the planar wall 78 and the plate 52, while two chambers 65 and 66 are arranged between the planar wall 78 and the plate 53. A bead 74 is formed into the dished region 62 of the plate 53, and extends in the lengthwise direction 57 from an edge of the plate 53 so that the bead extends through the fluid manifolding region 56. The plates 52, 53, and 54 are joined together at the location of the bead 74, so that the fluid manifolding region 56 is separated into two halves, with the chambers 64 and 65 located on one side of the bead 74 and the chambers 63 and 66 located on the other side. The joint at the bead 47 hydraulically separates the chamber 63 from the chamber 64, and the chamber 65 from the chamber 66. A corresponding bead 75 is provided in the intermediate plate 54 in order to allow for the creation of the joint. Alternatively, the corresponding bead could be provided in the plate 52.

A fluid inlet header 67 and a fluid outlet header 68 are joined to the plate 52 within the fluid manifolding area 56. Both of the headers 67, 68 are depicted, in the exemplary embodiment, as cylindrical headers, although other shapes such as, by way of example, D-shaped headers could be used instead. An inlet port 81 is joined to the inlet header 67 in order to provide the cooling fluid to the plate assembly 51, and an outlet port 82 is joined to the outlet header 68 in order to remove the cooling fluid from the plate assembly 51.

Two sets of apertures extending from the inlet header 67 provide fluid communication between the inlet header 67 and the fluid chambers 63 and 65. A first set of apertures 69 are aligned with the header 67 on the side of the bead 74 that corresponds with the location of the chamber 63, while a second set of apertures 70 are aligned with the header 67 on the side of the bead 74 that corresponds with the location of the chamber 65. Similarly, sets of apertures 71 and 72 provide fluid communication between the outlet header 68 and the fluid chambers 65 and 66, respectively. As a result, the chambers 63 and 65 are a first and a second inlet chamber for fluid flowing through the plate assembly 51, and the chambers 64 and 66 are a first and a second outlet chamber for fluid flowing through the plate assembly 51. The apertures are arranged so that the first inlet chamber 63 overlaps with the second outlet chamber 66 in a thickness direction 73 of the plate assembly, and the second inlet chamber 65 overlaps with the first outlet chamber 64 in the thickness direction 73.

The plate 52 is provided with collar flanges 76 surrounding the apertures 69 70, 71, and 72 to provide for easy positioning of the headers 67 and 68 onto the plate 52. Embossments 77 extend towards the plate 52 from the planar wall 78 of the intermediate plate 54 at the locations of the apertures 70 and 72, with the apertures extending through those embossments. The embossments 77 are disposed against the inwardly facing surface 61 of the plate 52 and are joined thereto, creating fluid seals. The seals at the apertures 70 prevent any leakage of fluid the header 67 and the chamber 64, which is located between the plate 52 and the chamber 65. In a similar way, the seals at the apertures 72 prevent any leakage of fluid between the header 68 and the chamber 63, which is located between the plate 52 and the chamber 66.

Additional embossments 83 are optionally provided in the fluid manifold region 56. The dimples 83, if present, extend from the planar wall 78 towards the plate 53, and engage with the inwardly facing surface 62 of that plate in order to provide structural support in the un-corrugated manifold region 56. The locations of the embossments 83 can be selected to coincide with the locations of the apertures 69 and 71 in order to improve the flow of fluid through the apertures.

During operation of the battery cooling plate heat exchanger 51, a flow of cooling fluid (for example, a liquid coolant or a refrigerant) is received into the inlet header 67 through the inlet port 81. The cooling fluid is distributed, preferably in approximately equal amounts, into the chambers 63 and 65 through the apertures 69 and 70, respectively. The chambers 63 and 65 thereby function as a first and a second inlet chamber for the cooling fluid. The portion of the cooling fluid that is received into the first inlet chamber 63 is distributed among the set of flow channels 58, and flows in a U-shaped flow pattern (indicated by the arrow 91 in FIG. 17) to the chamber 64. Similarly, the portion of the cooling fluid that is received into the second inlet chamber 65 is distributed among the set of flow channels 59, and flows in a U-shaped flow pattern (indicated by the arrow 92 in FIG. 17) to the chamber 66. The chambers 64 and 66 thereby function as a first and a second outlet chamber for the cooling fluid. The cooling fluid is received into the outlet header 68 from the outlet chambers 64 and 66 through the apertures 71 and 72, respectively, and is subsequently removed from the header 68 through the outlet port 82. The first inlet chamber 63, first outlet chamber 64, and flow paths 58 together define a first fluid volume within the battery plate heat exchanger. Similarly, the second inlet chamber 65, second outlet chamber 66, and flow paths 59 together define a second fluid volume within the battery plate heat exchanger. The first and second fluid volumes are hydraulically separated from one another between the plates 52 and 53. The first and second fluid volumes provide hydraulically parallel paths for fluid to pass from the inlet header 67 to the outlet header 68.

As the cooling fluid passes through the flow channels 58 and 59, heat energy that is received through one or both of the plates 52 and 53 is transferred by convection to the cooling fluid, thereby heating the cooling fluid. It should be observed that the two U-shaped flow paths 91 and 92 are oriented so that the flows along those paths are in counter-flow orientation. It should be further observed that, due to the nature of the corrugations 17, flow channels 58 and 59 are arranged in alternating fashion.

While FIG. 17 depicts an embodiment that uses a single U-shaped flow path on each side of the intermediate plate 54, it should be understood that in some alternative embodiments the flow paths 91 and 92 can include additional U-shaped passes. By way of example, the flow paths 41 and 42 (shown in FIG. 13) which each have two consecutive U-shaped passes could be substituted into the embodiment described in FIGS. 14-18 in order to improve the distribution of fluid among the multiple individual flow channels. In addition, it should be understood that the previously described embodiments of a battery cooling plate having such double U-shaped flow passages could be modified to have the single U-shaped flow passages of FIG. 17, for example to reduce the pressure drop incurred by the fluid as it passes through the plate assembly.

Orienting the flow paths 91 and 92 to be in a counterflow orientation to one another provides certain benefits, especially when the plate assembly 51 is to be used as a battery cooling plate heat exchanger. The corrugations 17 of the intermediate plate 54 are arranged such that each of the multiple nonlinear flow paths 58 and 59 include two linear flow segments 60 that extend in the lengthwise direction 57, one extending from an inlet chamber 63 or 65 and one extending to an outlet chamber 64 or 66. As previously indicated, two such linear flow segments is a minimum, since the flow paths 58 and 59 can include multiple U-shaped segments. The linear flow segments 60 of each flow path can be joined by an additional linear flow section extending in a direction perpendicular to the lengthwise direction 57 (i.e. a widthwise direction of the plate heat exchanger 51), as shown in the embodiment of FIG. 17, although in other alternative embodiments the U-shaped flow configuration can be achieved by, for example, non-linear connecting segments such as arcuate segments, or by piecewise linear segments arranged at varying angles to the lengthwise direction 57, or others.

As can be seen in the section view of FIG. 15, which is taken through some of the linear segments 60, that each of the linear flow segments 60 of a flow path 58 is adjacent to a linear flow segment 60 of a flow path 59, and vice versa. In all cases except for the end flow channels (such as that one of flow paths 59 arranged at the far right hand side of FIG. 15) each linear flow segment 60 is sandwiched between two linear flow segments 60 of the other flow path. Due to the counterflow orientation of the overall flow paths 91 and 92, the fluid traveling through those linear flow segments 60 extending from the inlet chamber 63 will be directly adjacent to fluid traveling through those linear flow segments 60 extending to the outlet chamber 66. Similarly, the fluid traveling through those linear flow segments 60 extending from the inlet chamber 65 will be directly adjacent to fluid traveling through those linear flow segments 60 extending to the outlet chamber 64. Since the fluid is continuously heated as it passes along the flow channels 58 and 59 by the battery mounted to the battery plate heat exchanger, the result is that the coldest fluid (i.e. the fluid in the channels 58 immediately downstream of the inlet chamber 63 and the fluid in the channels 59 immediately downstream of the inlet chamber 65) is interlaced with the hottest fluid (i.e. the fluid in the channels 58 immediately upstream of the outlet chamber 64 and the fluid in the channels 59 immediately upstream of the inlet chamber 66). This has the benefit of providing a more uniform temperature distribution on the outer surfaces of the plate 52 and/or the plate 53 to which the battery is mounted. Maintaining a more uniform temperature in the batteries is known to be beneficial to improved battery performance and life.

Figure 7:
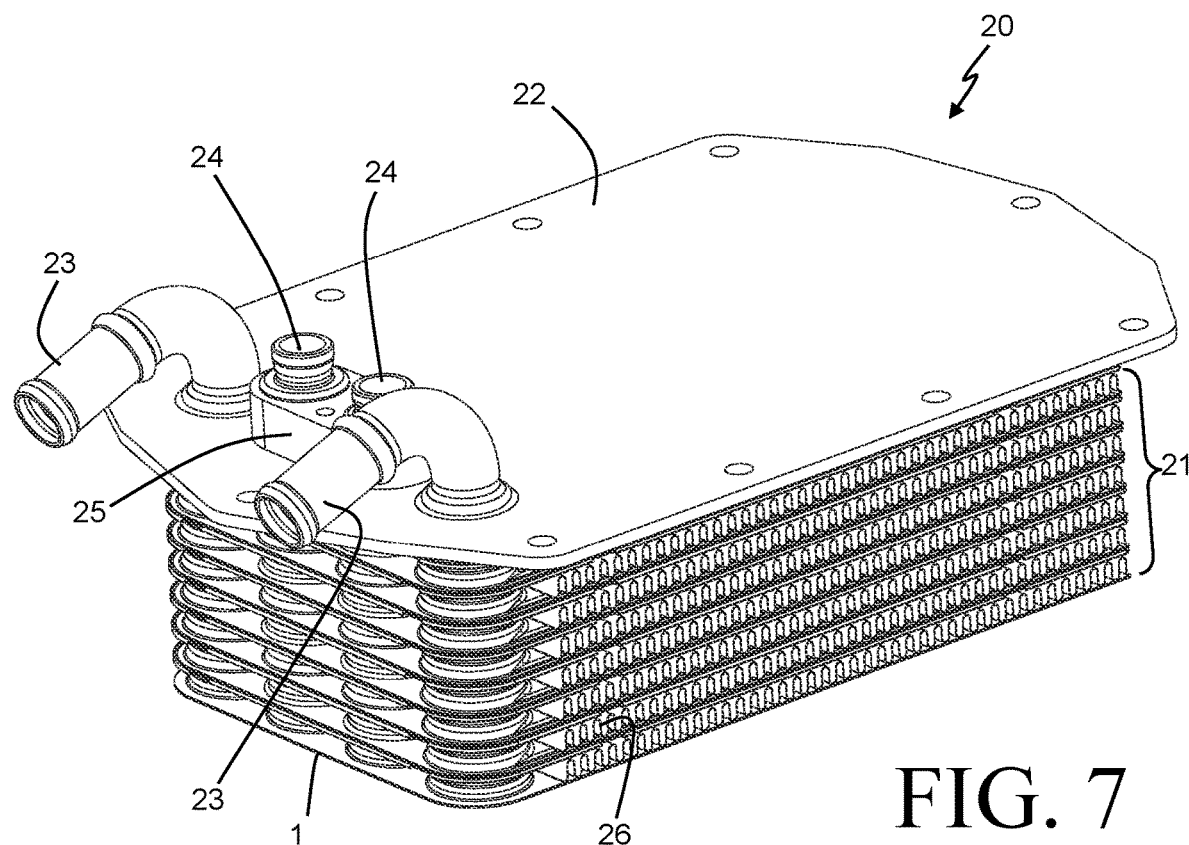
FIG. 7 is a perspective view of a heat exchanger employing the plate assembly of FIG. 1, according to another embodiment of the invention.

FIG. 7 depicts yet another embodiment of the invention, in which a heat exchanger 20 is constructed using a stack 21 of the plate assemblies 1. A top plate 22 having a footprint that extends beyond that of the stack 21 can be provided at an end of the stack 21 to allow for mounting of the heat exchanger 20 into an enclosure. By way of example, the stack 21 can be inserted through an open face of a housing so that the top plate 22 closes off the insertion opening, and the heat exchanger 20 can be secured to the housing by way of fastening locations 26 provided along the periphery of the top plate 22. Coolant ports 23 and a refrigerant fitting block 25 having refrigerant ports 24 can be mounted directly to top plate 22 to allow for fluid connection of the heat exchanger 20 within a heat transfer system.

The plate assemblies 1 of the stack 21 are arranged so that the embossed areas 7 of one plate assembly 1 within the stack 21 abut and are joined to the embossed areas 8 of an adjacent plate assembly 1. In this manner, the aligned fluid chambers 9, 10 can be connected by the apertures 18 and 19 to form fluid manifolds extending along the height of the stack 21. Coolant and/or refrigerant entering the heat exchanger 20 through one of the coolant ports 23 and/or refrigerant ports 24 can be distributed to the flow paths 41, 42 within the individual plate assemblies 1 by way of these fluid manifolds. Similarly, the fluids can be collected from the flow paths into the fluid manifolds corresponding to the outlet ports to enable the removal of the fluid from the heat exchanger 20. Such a complete stack 21 can preferably be formed in a single furnace brazing operation.

Serpentine fins 26 can be provided within the spaces between adjacent planar surfaces 50 of the plate assemblies 1, and can be bonded to those planar surfaces 50 to provided extended heat transfer surfaces for a fluid passing through those spaces. By way of example, such a heat exchanger 20 can provide particular utility for cooling a flow of heated air passing through the serpentine fins. Heat can be transferred to both a flow of coolant and to a flow of refrigerant passing through the heat exchanger 20. As discussed previously, by transferring heat to the two streams simultaneously, the undesirable aspects of both single-phase liquid cooling and two-phase refrigerant cooling can be avoided. In some alternative embodiments, the stack 21 can be constructed of the plate assemblies of the embodiment of FIG. 6, so that a single fluid is used to cool the flow of air through the fins 26. It should be appreciated that the direction of heat transfer can be reversed so that the heat exchanger 20 is used to heat a flow of fluid passing through the fins 26, rather than cooling it.

It may be desirable, in some alternative versions of the heat exchanger 20, for one of the cooling fluids to pass through some, but not all, of the plate assemblies. This can be accomplished by removing the intermediate plate 4 from some of the plate assemblies, and instead placing spacer disks between the embossed areas 7, 8 in places corresponding to either the embossments 15 or the embossments 16, depending on the fluid that is to be precluded from flowing through the plate assembly. The spacer disks provide for fluid continuity through the fluid manifolds without allowing that one of the fluids to pass through the heat exchange area of the plate assembly.

Figure 8:
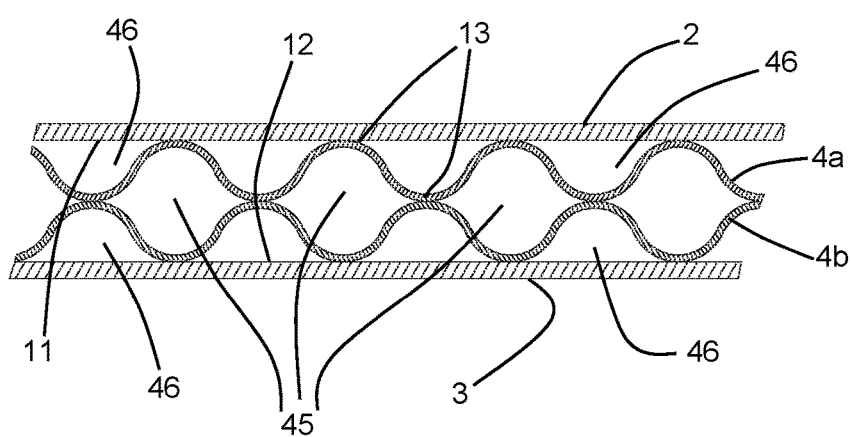
FIG. 8 is a partial sectional view of an alternative embodiment of the plate assembly of FIG. 1.
Figure 9:
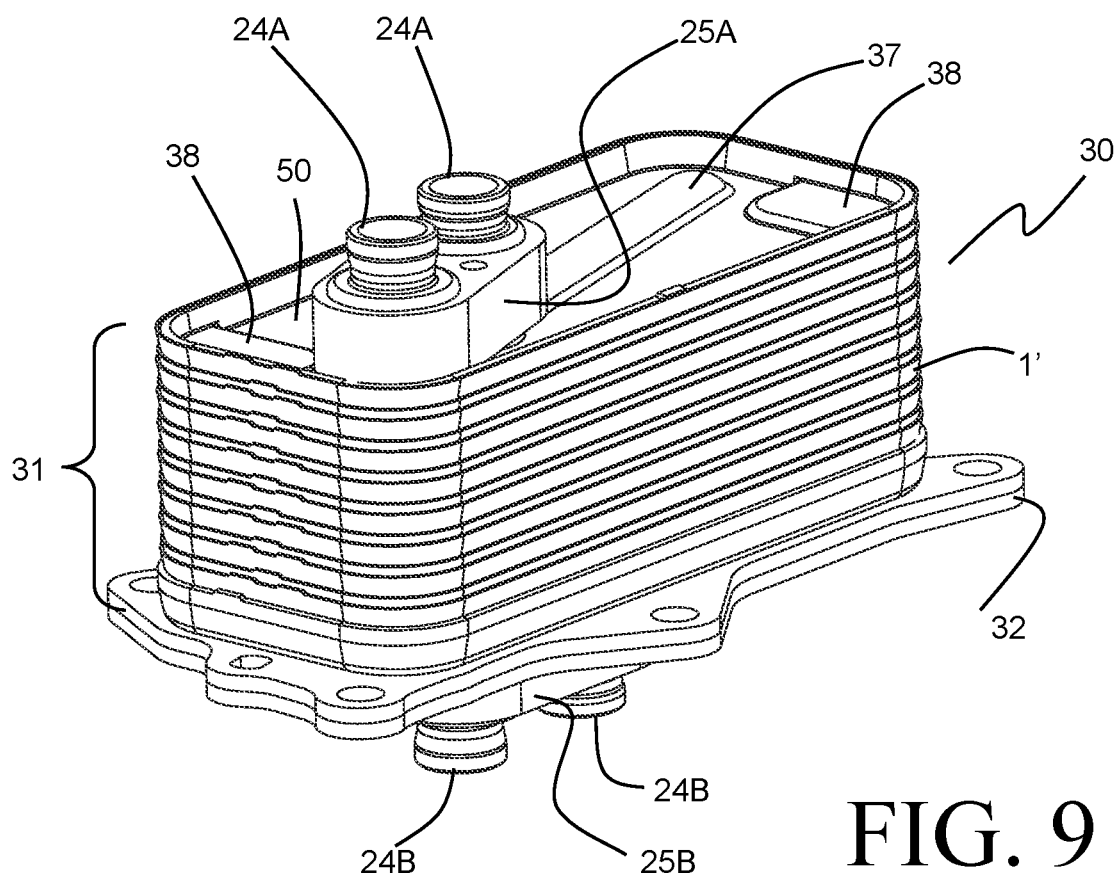
FIG. 9 is a perspective view of a heat exchanger according to yet another embodiment of the invention.
Figure 10:
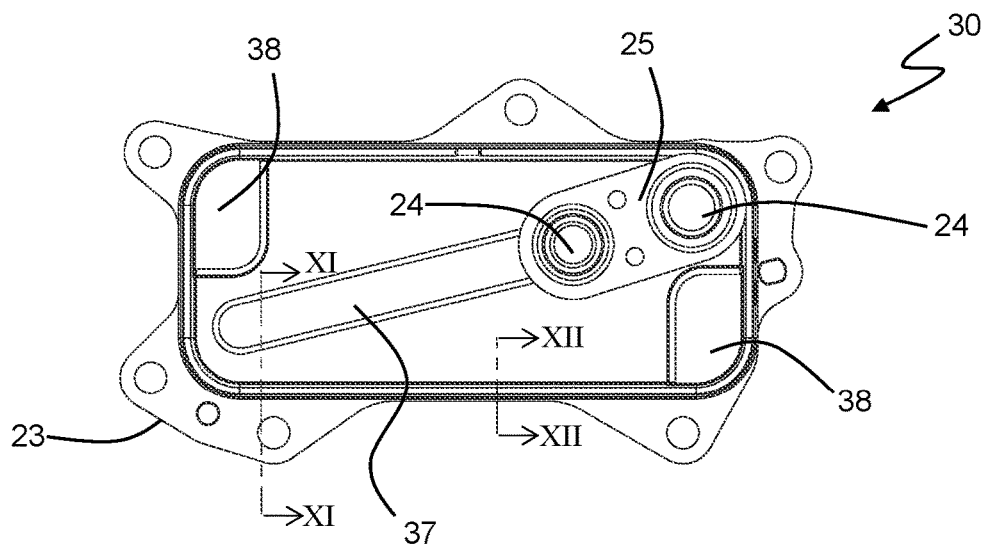
FIG. 10 is a plan view of the heat exchanger of FIG. 9.

In some alternative embodiments, a plate assembly 1 includes a pair of intermediate plates 4 arranged between the plates 2 and 3, as depicted in FIG. 8. Crests and troughs 13 of a first one of the intermediate plates 4 (identified as 4a in FIG. 8) are alternatingly joined to the inwardly facing surface 11 of the plate 2 and the other one of the intermediate plates 4 (identified as 4b in FIG. 8). In a similar manner, crests and troughs 13 of the intermediate plate 4b are alternatingly joined to the inwardly facing surface 13 of the plate 3 and the intermediate plate 4a. This provides a fluid volume 45 between the intermediate plates 4a, 4b through which one of the flow paths 41, 42 can extend, while the other one of the flow paths can extend through the volumes 46 created between the intermediate plates and the surfaces 11 and 12. Heat can thus be transferred from a heat source provided on external surfaces of both of the plates 2 and 3 to the fluid passing through the volume 46, and from that fluid to the fluid passing through the volume 45, or vice-versa.

Another alternative embodiment of the invention contemplates a heat exchanger 30 constructed as a stacked-plate style heat exchanger, as shown in FIGS. 9-12. The heat exchanger 30 includes multiple plate assemblies 1' that are stacked together in a nested relationship to form a stack 31. As best seen in the cross-sectional detail views of FIGS. 11 and 12, each of the plate assemblies 1' includes a first formed plate 2', a second formed plate 3', and an intermediate plate 4'. The plates 2', 3' and 4' are generally similar to the previously described plates 2, 3 and 4 respectively, but differ in that each of the plates 2', 3' and 4' are provided with an upturned angled edge extending along the plate periphery. The upturned edges cooperate to allow the plates of each plate assembly 1' to nest together along the peripheral edges, allowing for a self-stacking arrangement of the plates within a plate assembly 1', and also allowing for a similar self-stacking arrangement of adjacent ones of the plate assemblies 1' within the stack 31.

The heat exchanger 30 is especially well-suited for enabling the exchange of heat between a liquid coolant flow and two separate refrigerant flows. The two separate refrigerant flows can each be directed through the plate assemblies 1', with a first one of the refrigerant flows passing along the flow channels provided on one side of the intermediate plates 4 and a second one of the refrigerant flows passing along the flow channels provided on the opposing side of the intermediate plates 4. In a similar manner to that described previously with respect to the earlier embodiments, embossed areas 7 are formed into the plates 2' and embossed areas 8 are formed into the plates 3'. However, instead of being arranged along a common edge of the heat exchanger 30, the embossed areas 7 and 8 are arranged in two diagonally opposing corners of the heat exchanger.

Each adjacent pair of plate assemblies 1', in addition to being joined together at the nested peripheral edges of the plate assemblies, is joined by the embossed area 7 of one plate assembly 1' directly abutting and bonded to the embossed area 8 of the other plate assembly 1'. Embossments 15 and 16 are again provided in opposing directions on each of the intermediate plates 4', with the embossments 15 disposed against and bonded to the embossed areas 7 and with the embossments 16 disposed against and bonded to the embossed areas 8. Apertures are again provided in the embossments 15 and 16 and in the embossed areas 7 and 8, thereby forming a fluid manifold 48 for one of the two refrigerant flows and a fluid manifold 49 for the other of the two refrigerant flows at each of the two diagonally opposing corners of the heat exchanger 30 to distribute the refrigerant to and from the flow passages within the plate assemblies 1'.

Connection of the refrigerant flow paths to one or more refrigerant systems is accomplished by way of a first refrigerant fitting block 25A affixed to one end of the heat exchanger 30 in the stacking direction and a second refrigerant block 25B affixed to the opposing end of the heat exchanger 30 in the stacking direction. The fitting block 25A includes two refrigerant ports 24A for the first one of the refrigerant flows, with one of the ports 24A serving as a refrigerant inlet port to provide that first flow of refrigerant to the heat exchanger 30, and the other serving as a refrigerant outlet port to remove that first flow of refrigerant from the heat exchanger 30. Similarly, the fitting block 25B includes two refrigerant ports 24B for the second one of the refrigerant flows, with one of the ports 24B serving as a refrigerant inlet port to provide that second flow of refrigerant to the heat exchanger 30, and the other serving as a refrigerant outlet port to remove that second flow of refrigerant from the heat exchanger 30.

Each of the fitting blocks 25A, B can preferably be arranged at one of the two opposing corners corresponding to the locations of the fluid manifolds 48, 49. This conveniently allows for one of the two ports 24A to be connected to either the fluid manifold 48 or the fluid manifold 49 at its corresponding corner, with the other of the two ports 24A connected to the corresponding port 48 or 49 at the opposing corner by way of a transfer channel 37 provided at the end of the heat exchanger 30. Such a transfer channel 37 can be conveniently provided by a deformation in an end plate 50 that is provided at the top end of the stack 31. Similarly, one of the two ports 24B can be connected to either the fluid manifold 48 or the fluid manifold 49 at its corresponding corner, with the other of the two ports 24B connected to the corresponding port 48 or 49 at the opposing corner by way of a similar transfer channel provided within a base plate 32 provided at the bottom of the stack 31. The fitting blocks 25A and 25B can be arranged at one common corner of the heat exchanger 30, or at opposing corners.

Figure 11:
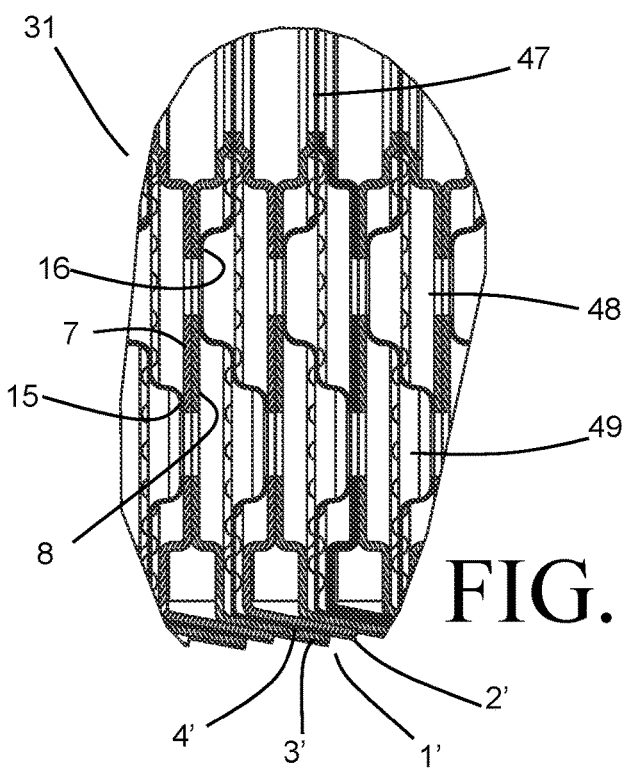
FIG. 11 is a partial sectional view taken along the lines XI-XI of FIG. 10.
Figure 12:
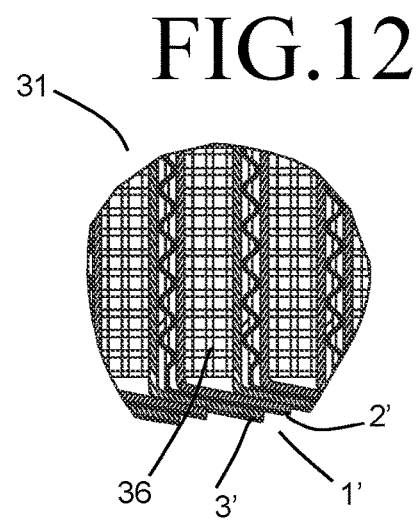
FIG. 12 is a partial sectional view taken along the lines XII-XII of FIG. 10.

Fluid manifolds 47 for the flow of coolant can be provided at the remaining two diagonally opposing corners 38, and can be connected by way of coolant passages arranged between adjacent ones of the plate assemblies 1'. Turbulating inserts for the coolant (generally represented in the detail cross-sectional view of FIG. 12 by the reference number 36) can be provided between the plate assemblies 1', with appropriate cut-outs at the corners to accommodate the embossed areas 7 and 8. As shown in FIG. 11, the fluid manifolds 47 for the coolant can be formed by providing apertures in the inserts 36 as well as in the plates 2', 3' and 4', with the surfaces of the plates in each plate assembly 1' joined together at the periphery of those apertures to seal the coolant manifolds from the internal volumes of the plate assemblies 1. Inlet and outlet ports for the flow of coolant are not shown, but can be easily provided in either the base plate 32, the top plate 50, or both.

In a similar manner to that previously described with reference to the embodiment of FIG. 7, it is possible for the intermediate plate 4' to be provided within fewer than all of the plate assemblies 1', with suitable spacers added within those of the assemblies 1' lacking such an intermediate plate 4' to provide for fluid integrity of the fluid manifolds 48 or 49 through that plate assembly.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A battery cooling plate heat exchanger, comprising:
    a first plate;
    a second plate;
    an intermediate plate arranged between the first plate and the second plate and joined thereto at peripheral edges to create a sealed periphery, the intermediate plate having corrugations with crests and troughs, each crest in contact with an inwardly facing surface of the first plate, and each trough in contact with an inwardly facing surface of the second plate;
    a fluid manifolding area arranged at an end of the battery cooling plate heat exchanger in a lengthwise direction of the battery cooling plate heat exchanger;
    a first inlet chamber, first outlet chamber, second inlet chamber, and second outlet chamber arranged within the fluid manifolding area;
    a first plurality of nonlinear fluid flow paths arranged between the intermediate plate and the first plate and providing fluid connections between the first inlet chamber and the first outlet chamber; and
    a second plurality of nonlinear fluid flow paths arranged between the intermediate plate and the second plate and providing fluid connections between the second inlet chamber and the second outlet chamber,
    wherein each of the first plurality of nonlinear fluid flow paths extends between one of the troughs and the first plate,
    wherein each of the second plurality of nonlinear fluid flow paths extends between one of the crests and the second plate, wherein a first plane extends parallel to the intermediate plate and a second plane is perpendicular to the first plane, wherein a portion of each of the first plurality of nonlinear fluid flow paths overlaps with a portion of one of the second nonlinear fluid flow paths in both of the first plane and the second plane, and wherein the battery cooling plate heat exchanger further comprises:

an inlet header joined to the first plate and fluidly connected to the first inlet chamber by way of a first plurality of apertures and to the second inlet chamber by way of a second plurality of apertures; and an outlet header joined to the first plate and fluidly connected to the first outlet chamber by way of a third plurality of apertures and to the second outlet chamber by way of a fourth plurality of apertures.

2. The battery cooling plate heat exchanger of claim 1, wherein:

each of the first plurality of nonlinear fluid flow paths includes at least two linear flow segments extending in said lengthwise direction of the battery cooling plate heat exchanger;

each of the second plurality of nonlinear fluid flow paths includes at least two linear flow segments extending in said lengthwise direction of the battery cooling plate heat exchanger;

each of said linear flow segments of the first plurality of nonlinear fluid flow paths is adjacent to at least one of said linear flow segments of the second plurality of nonlinear fluid flow paths; and fluid traveling along each one of said linear flow segments of the first plurality of nonlinear fluid flow paths is flowing in a direction opposite that of fluid traveling along the adjacent linear flow segments of the second plurality of nonlinear fluid flow paths.

3. The battery cooling plate heat exchanger of claim 1, wherein fluid flowing along the first plurality of nonlinear fluid flow paths between the first inlet chamber and the first outlet chamber is traveling in a counterflow orientation to fluid flowing along the second plurality of nonlinear fluid flow paths between the second inlet chamber and the second outlet chamber.

4. The battery cooling plate heat exchanger of claim 1, wherein each one of the first and second pluralities of nonlinear fluid flow paths extends in a unbroken and non-communicating manner with other ones of the first and second pluralities of nonlinear fluid flow paths between the first and second inlet chambers and the first and second outlet chambers.

5. The battery cooling plate heat exchanger of claim 1, wherein the second and the fourth pluralities of apertures extend through both the first plate and the intermediate plate, and wherein the first and the third pluralities of apertures extend through the first plate but not through the intermediate plate.

6. The battery cooling plate heat exchanger of claim 1, wherein the first inlet chamber overlaps with the second outlet chamber in a thickness direction of the battery cooling plate and wherein the second inlet chamber overlaps with the first outlet chamber in said thickness direction.

7. The battery cooling plate heat exchanger of claim 1, further comprising a bead formed into one of the first and second plates and extending from an edge of said plate and extending through the fluid manifolding area, wherein the intermediate plate is joined to both the first and the second plate in the region of the bead in order to hydraulically separate the first inlet chamber from the first outlet chamber and the second inlet chamber from the second outlet chamber.

8. The battery cooling plate heat exchanger of claim 7, wherein the bead separates the fluid manifolding area into a first half containing the first inlet chamber and the second outlet chamber and a second half containing the second inlet chamber and the first outlet chamber.

9. The battery cooling plate of claim 1 heat exchanger, wherein each one of the first plurality of nonlinear fluid flow paths and each one of the second plurality of nonlinear flow paths defines one or more U-shaped flow paths through the battery plate heat exchanger.

10. The battery cooling plate of claim 1 heat exchanger, wherein the first inlet chamber, first outlet chamber, and first plurality of nonlinear flow paths together define a first fluid volume within the battery plate heat exchanger and wherein the second inlet chamber, second outlet chamber, and second plurality of nonlinear flow paths together define a second fluid volume within the battery plate heat exchanger, the first and second fluid volumes being hydraulically separated from one another between the first and second plates.

11. The battery cooling plate heat exchanger of claim 10, wherein the inlet header and the outlet header are in fluid communication with the first and second fluid volumes such that a first flow circuit extending between the inlet header and the outlet header through the first fluid volumes is hydraulically in parallel with a second flow circuit extending between the inlet header and the outlet header through the second fluid volume.

12. A battery cooling plate heat exchanger, comprising:

a first plate having a first raised central portion;

a second plate;

an intermediate sheet comprising a plurality of corrugations that extend partially within the first raised central portion from the first plate to the second plate;

a first chamber located between the first plate and the intermediate sheet, the first chamber including first flow channels defined by the plurality of corrugations, and a first manifold fluidly connected to the first flow channels; and a second chamber located between the second plate and the intermediate plate sheet, the second chamber including second flow channels defined by the plurality corrugations, and a second manifold fluidly connected to the second flow channels, wherein the intermediate sheet is sealed to the first plate around the first chamber and wherein the intermediate sheet is sealed to the second plate around the second chamber, wherein each corrugation of the plurality of corrugations extends from a crest joined to the first raised central portion of the first plate to a trough joined to the second plate, wherein each of the first channels extends between one of the troughs and the first plate, wherein each of the second channels extends between one of the crests and the second plate, wherein a first plane extends parallel to the intermediate sheet and a second plane is perpendicular to the first plane, wherein a portion of each of the first channels overlaps with a portion of one of the second channels in both of the first plane and the second plane, wherein the first chamber and the first manifold together define a first fluid volume within the battery plate heat exchanger and wherein the second chamber and the second manifold together define a second fluid volume within the battery plate heat exchanger, the first and second fluid volumes being hydraulically separated from one another between the first and second plates, and wherein an inlet header and an outlet header are in fluid communication with the first and second fluid volumes such that a first flow circuit extending between the inlet header and the outlet header through the first fluid volume is hydraulically in parallel with a second flow circuit extending between the inlet header and the outlet header through the second fluid volume.

13. The battery cooling plate heat exchanger of claim 12, wherein the second plate includes a second raised central portion, and wherein the plurality of corrugations extend partially within the second raised central portion.

14. The battery cooling plate heat exchanger of claim 12, wherein the intermediate sheet includes a first embossment that extends to the second plate and a second embossment that extends to the first plate.

15. The battery cooling plate heat exchanger of claim 14, wherein both the first embossment and the second embossment at least partially define both the first manifold and the second manifold.

16. A heat exchanger, comprising:
a first plate having a first surface;
a second plate having a second surface;
an intermediate sheet comprising a third surface, a fourth surface, and a plurality of corrugations that partially define the third surface and that partially define the fourth surface;
a first fluid chamber located between the first surface and the third surface, the first fluid chamber including first flow channels defined by the plurality of corrugations, and a first manifold fluidly connected to the first flow channels; and
a second fluid chamber located between the second surface and the fourth surface, the second fluid chamber including second flow channels defined by the plurality corrugations, and a second manifold fluidly connected to the second flow channels,
wherein the third surface is sealed to the first surface around the first chamber and wherein the fourth surface is sealed to the second surface around the second chamber,
wherein each corrugation of the plurality of corrugations extends from a crest joined to the first plate to a trough joined to the second plate,
wherein each of the first flow channels extends between one of the troughs and the first surface,
wherein each of the second flow channels extends between one of the crests and the second surface,
wherein a first plane extends parallel to the intermediate sheet and a second plane is perpendicular to the first plane,
wherein a portion of each of the first flow channels overlaps with a portion of one of the second flow channels in both of the first plane and the second plane,
wherein each of the plurality corrugations includes a crest, a trough, and a flank between the crest and the trough,
wherein the flank is oriented at an oblique angle to first surface, and
wherein an inlet header and an outlet header are in fluid communication with the first and second fluid chambers such that a first flow circuit extending between the inlet header and the outlet header through the first fluid chamber is hydraulically in parallel with a second flow circuit extending between the inlet header and the outlet header through the second fluid chamber.

17. The heat exchanger of claim 16, wherein the first flow channels define a first plurality of parallel passes, wherein flow directions of adjacent parallel passes of the first plurality of parallel passes is opposite, and wherein the first flow channels define a first return bend between adjacent parallel passes of the first plurality of parallel passes.

18. The heat exchanger of claim 17, wherein the second flow channels define a second plurality of parallel passes, wherein flow directions of adjacent parallel passes of the second plurality of parallel passes is opposite, and wherein the second flow channels define a second return bend between adjacent parallel passes of the second plurality of parallel passes.

19. The heat exchanger of claim 18, wherein the flow direction of a first one of the parallel passes of the first plurality of parallel passes is opposite of the flow direction of a first one of the parallel passes of the second plurality of parallel passes that is adjacent in a thickness direction to the first one of the parallel passes of the first plurality of parallel passes.

* * * * *